(12) United States Patent
Wood

(10) Patent No.: US 7,431,381 B2
(45) Date of Patent: Oct. 7, 2008

(54) WAKE STABILIZATION DEVICE AND METHOD FOR REDUCING THE AERODYNAMIC DRAG OF GROUND VEHICLES

(76) Inventor: Richard Michael Wood, 754 Suffolk La., Virginia Beach, VA (US) 23452

( * ) Notice: Subject to any disclaimer, the term of this patent is extended or adjusted under 35 U.S.C. 154(b) by 0 days.

(21) Appl. No.: 11/519,493

(22) Filed: Sep. 11, 2006

(65) Prior Publication Data

US 2007/0089531 A1    Apr. 26, 2007

Related U.S. Application Data

(60) Provisional application No. 60/717,017, filed on Sep. 15, 2005.

(51) Int. Cl.
*B62D 35/00* (2006.01)
(52) U.S. Cl. .................. 296/180.1; 296/180.4
(58) Field of Classification Search ............ 296/180.1, 296/180.2, 180.3, 180.4
See application file for complete search history.

(56) References Cited

U.S. PATENT DOCUMENTS

| | | | |
|---|---|---|---|
| 2,737,411 A | 3/1956 | Potter | |
| 3,010,754 A | 9/1961 | Shumaker | |
| 3,999,797 A | 12/1976 | Kirsch | |
| 4,006,932 A | 2/1977 | McDonald | |
| 4,214,787 A | 7/1980 | Chain | |
| 4,257,641 A | 3/1981 | Keedy | |
| 4,451,074 A | 5/1984 | Scanlon | |
| 4,458,936 A | 7/1984 | Mulholland | |
| 4,508,380 A | 4/1985 | Sankrithi | |
| 4,601,508 A | 7/1986 | Kerian | |
| 4,682,808 A | 7/1987 | Bilanin | |
| 4,741,569 A | 5/1988 | Stephen | |
| 4,789,117 A * | 12/1988 | Paterson et al. ............. 244/130 |
| 4,978,162 A | 12/1990 | Labbe | |
| 5,269,983 A | 12/1993 | Schulz | |
| 5,280,990 A | 1/1994 | Rinard | |
| 5,348,366 A | 9/1994 | Baker | |
| 5,498,059 A | 3/1996 | Switlik | |
| 5,908,217 A | 6/1999 | Englar | |
| 6,092,861 A | 7/2000 | Whelan | |
| 6,257,654 B1 | 7/2001 | Boivin et al. | |
| 6,485,087 B1 * | 11/2002 | Roberge et al. .......... 296/180.5 |
| 6,886,882 B2 * | 5/2005 | Farlow et al. ............ 296/180.4 |
| 2003/0011210 A1 * | 1/2003 | Cory ....................... 296/180.1 |

* cited by examiner

*Primary Examiner*—Dennis H. Pedder
*Assistant Examiner*—Melissa A Black
(74) *Attorney, Agent, or Firm*—Williams Mullen; M. Bruce Harper

(57) ABSTRACT

An improved method and device for the reduction of aerodynamic drag and for improved performance of bluff base vehicles by increasing the pressure on the bluff base of the vehicle by controlling the wake flow and the interaction of the wake flow with the vehicle bluff base region. An improved method and device for generating a reduction in drag force on the bluff base of a body moving through a fluid. The apparatus consists of two opposing panels attached to the bluff base and aligned approximately parallel to the side edge of the bluff base and lying in a plane that is parallel to the vehicle centerline. The drag force reduction results from controlling the flow entering the bluff base trailing wake from the left side surface, right side surface, bottom surface, and top surfaces of the vehicle. The objects and advantages also extend to other applications in which an object, body, or vehicle is moving through either a gas or a fluid.

11 Claims, 22 Drawing Sheets

$X_a = (Y^2 + W^2)^{.5}$
$X_b = Y + W$ $$Xa = (Y^2 + W^2)^{.5}$$

$$Xb = Y + W$$

View of Left Side Panel

View of Left Side Panel

View of Left Side Panel

View of Left Side Panel

View of Left Side Panel

View of Left Side Panel

View of Left Side Panel

Horizontal Section Cut
View from Top

WAKE STABILIZATION DEVICE AND METHOD FOR REDUCING THE AERODYNAMIC DRAG OF GROUND VEHICLES

CROSS-REFERENCE TO RELATED APPLICATIONS

This application claims a previous provisional patent application, number 60/717,017 with a filing date of Sep. 15, 2005 and entitled "Wake stabilization device and method for reducing the aerodynamic drag of ground vehicles".

This application claims a previous provisional patent application, No. 60/717,017 with a filing date of Sep. 15, 2005 and entitled "Wake stabilization device and method for reducing the aerodynamic drag of ground vehicles".

ORIGIN OF THE INVENTION

The invention described herein was made by employees of the United States Government, and may be manufactured and used by or for the Government without payment of any royalties thereon or therefor.

REFERENCE TO SEQUENCE LISTING, A TABLE, OR A COMPUTER PROGRAM LISTING COMPACT DISK APPENDIX

Not applicable.

BACKGROUND

1. Field of Invention

The invention relates to the reduction of aerodynamic drag for moving ground vehicles; specifically to an improved method and device for the reduction of aerodynamic drag and for improved performance of ground vehicles by increasing the pressure on the base area of a vehicle or vehicle component by controlling the flow in wake of the vehicle or vehicle component.

2. Description of Prior Art

In the prior art there have been attempts to reduce the aerodynamic drag associated with the bluff base of the trailer of a tractor-trailer truck system. The wake flow emanating from the bluff base trailer is characterized as unsteady and dynamic. The unsteady nature of the wake flow is a result of asymmetric and oscillatory vortex shedding of the side surface and top surface flow at the trailing edge of the top and side surfaces of the vehicle. The boundary-layer flow passing along the top and side surfaces of the vehicle is at a low energy state and is unable to expand around the corner defined by the intersection of the side or top surfaces with the base surface. The boundary-layer flow separates at the trailing edge of the top and side surfaces and forms rotational-flow structures that comprise the bluff-base wake flow. The low energy flow separating at the trailing edges of the side surfaces and top surface of the trailer is unable to energize and stabilize the low energy bluff-base wake flow. The large rotational-flow structures comprising the wake interact with each other imparting an unsteady pressure loading on the vehicle base. The resulting flow interaction in the vehicle wake and unsteady pressure loading on the vehicle base contributes to the low pressures acting on the vehicle base and therefore high drag force. The resulting bluff-base wake-flow structure emanating from the base area of the vehicle is comprised of the vortex structures that are shed from trailing edges of the side surfaces and top surface of the vehicle. Contributing to the low-energy bluff-base wake is the low-energy turbulent flow that exits from the vehicle undercarriage at the base of the vehicle. The unsteady wake flow imparts a low pressure onto the aft facing surface of the trailer base that results in significant aerodynamic drag. Prior art has addressed the bluff base flow phenomena by adding to or installing various devices to the bluff base region. Examples of these devices are: a contoured three-dimensional aerodynamic surface referred to as a boat-tail; bluff base extensions/flaps/fairings/panels/plates which extend rearward from the side, top and/or lower surfaces that create a cavity; three or four surface panels/plates that extend rearward from the bluff base and are aligned approximately parallel to the side, top and/or lower surfaces of the vehicle and are designed to trap vortices shed from the trailing edges. All of these previous devices have geometrically-simple trailing edges and have an upstream edge that abuts the bluff base surface. Prior art also show the forcing the side surface and top surface flow into the base region through the use of turning vanes or jets of air.

Prior art has used the aerodynamic boat-tail fairings applied to the trailer base in order to eliminate flow separation and associated drag, see U.S. Pat. Nos. 4,458,936, 4,601,508, 4,006,932, 4,451,074, 6,092,861, 4,741,569, 4,257,641, 4,508,380, 4,978,162 and 2,737,411. These representative aerodynamic boat-tail fairing devices, while successful in eliminating flow separation, are complex devices that are typically comprised of moving parts that require maintenance and add weight to the vehicle. These devices take a variety of form and may be active, passive, rigid, flexible and/or inflatable. These attributes have a negative impact on operational performance and interfere with normal operations of the vehicle.

Other concepts as documented in U.S. Pat. Nos. 5,348,366, 4,682,808 and 4,214,787 consist of three or four plates/panels that are attached to the base of a trailer or extend from support mechanisms that are attached to the base of a trailer. These devices operate by trapping the separated flow in a preferred position in order to create an effective aerodynamic boat-tail shape. These representative trailer base devices, while successful in reducing the drag due to base flow are complex devices that are typically comprised of moving parts that require maintenance and add weight to the vehicle. All of these devices add significant weight to the vehicle. These attributes have a negative impact on operational performance and interfere with normal operations of the vehicle.

U.S. Pat. Nos. 3,010,754, 5,280,990, 2,569,983 and 3,999,797 apply a flow turning vane to the outer perimeter of the trailer base on the sides and top to direct the flow passing over the sides and top of the trailer into the wake in order to minimize the drag penalty of the trailer base flow. These devices provide a drag reduction benefit but they require maintenance and interfere with normal operations of the trailers fitted with swinging doors. These devices also add weight to the vehicle that would have a negative impact on operational performance of the vehicle.

Several concepts employ pneumatic concepts to reduce the aerodynamic drag of tractor-trailer truck systems. U.S. Pat. No. 5,908,217 adds a plurality of nozzles to the outer perimeter of the trailer base to control the flow turning from the sides and top of trailer and into the base region. This patent provides a drag reduction benefit but as with the other devices discussed previously this device is complex, comprised of moving parts, interfere with normal operations of the truck and add weight to the vehicle. These characteristics of the device results in a negative impact on the vehicle operational performance.

SUMMARY OF THE INVENTION

The object of the invention is to prohibit the interaction of naturally occurring large-scale bluff-body wake flow structures by creating a three-dimensional, self-optimizing, fluidic, aerodynamic surface, that is of minimum stream wise extent and consists of two panels attached to the base of a bluff base vehicle. The self-optimizing fluidic surface is created through the selected use of three flow control concepts; vortex trapping, flow venting, and trailing edge energizing. The technologies employed to accomplish the flow control objectives are; two opposing panels aligned approximately parallel to the side edge of the vehicle and lying in a plane that is parallel to the vehicle centerline to trap vortex structures, gap between the bluff base and the plate leading edge to allow flow venting, and complex geometric shaping of the plate trailing edge and/or the use of micro vortex strakes to energize and promote turning of the panel trailing edge flow. The use of each of these three technologies in the design of the wake stabilization device for a vehicle is dependent upon the vehicle geometry, operational requirements, and maintenance requirements. Trapping of the two vertically orientated and symmetrically positioned vortex structures and energizing and turning of the trapped-vortex external flow field is accomplished with; two opposing panels aligned approximately parallel to the side edge of the vehicle and lying in a plane that is parallel to the vehicle centerline that extend aft from the bluff base a distance that is between 15 and 25 percent of the vehicle width and are configured with either a complex, planar, geometrically shaped trailing edge, micro vortex strakes and a vent slot at the plate leading edge. The two trapped vortex structures form a fluidic surface that allows the flow exiting the trailing edge of the side and top exterior surfaces of the trailer to expand into the base region and provide drag reduction, increased fuel economy and improved operational performance. The trailing edge geometric shaping promotes turning of the trapped-vortex external flow field thereby increasing the drag reduction benefit of the trapped vortex technology. The vent slot located at the plate leading edge allows flow to pass from bluff base region inboard of the plate to the outboard region of the plate thereby stabilizing the trapped vortex and improving the flow turning into the base and resulting in increased drag reduction. Aerodynamic drag reduction is created by increasing the average pressure loading on the bluff-base aft-facing surface of the vehicle or vehicle component such as the trailer of a tractor-trailer truck. The invention relates to flow in the base region behind a bluff-base vehicle or vehicle component. The flow in the base region behind a bluff-base vehicle or vehicle component is a function of vehicle geometry, vehicle speed and the free stream flow direction.

The device provides improved performance for both the no crosswind condition, in which the ambient air is still, as well as the condition when crosswind flow is present. For all moving vehicles that operate on the ground a crosswind flow is always present due to a combination of atmospheric and environmental factors and the interaction of the naturally occurring wind with stationary geological and manmade structures adjacent to the vehicle path as well as interfering flows from adjacent moving vehicles. The device is designed to reduce aerodynamic drag for the all cross wind conditions for single and multiple-component bluff-base vehicles. The subject device uses vortex flows to allow the flow passing along the exterior top and side surfaces of a bluff-base ground vehicle to smoothly exit the vehicle at the trailing edge and pass into the wake. The subject device provides reduced aerodynamic drag for all of bluff-base ground vehicles.

The present invention is a simple device comprised of two thin, slender and rigid panels that attach to the exterior surface of the bluff base of a ground vehicle or vehicle component. The panels generally have a thickness of up to 3 inches. The spacing and orientation of the two panels, comprising the device, are dependent upon the vehicle geometry and vehicle operating conditions.

The present invention pioneers a novel device that is comprised of two opposing panels aligned approximately parallel to the side edge of the vehicle and lying in a plane or surface that is parallel to the vehicle centerline that are attached to the bluff base exterior surfaces of a bluff-base vehicle or vehicle component. The two panels are located on the base area on the vehicle. The two panels are symmetrically positioned about the vehicles vertical plane of symmetry. To maximize the ability of each panel to trap a vortex structure the panels are aligned approximately parallel to the side edge of the vehicle base and lie in a plane that is parallel to the centerline of the vehicle. Each of the two panels extends rearward an equal distance from the exterior rear surface of the bluff-base vehicle. Each of the two panels extends rearward between 15 and 25 percent of the vehicle width from the exterior rear surface of the bluff-base vehicle. Each of the two panels are offset from the respective side edge a distance that is between 0.0 and 10.0 percent of the vehicle width. The two panels are applied symmetrically to the vehicle, about a vertical plane passing through the centerline of the vehicle. Each of the two panels may be comprised of multiple elements or segments and/or may be contain local gaps, holes, cutouts, and/or bumps in order to accommodate specific vehicle or vehicle component geometry.

For ground vehicles such as tractor-trailer trucks, which have a cross-section shape that is predominately rectangular or square, the two panels will be predominately planar, except as required to accommodate vehicle specific geometric features. The flow passing over this class of vehicle is parallel to the vehicle centerline and moving aft along the vehicle surface. Each of the two panels may be comprised of various segments that may vary in number, shape, width and orientation that is determined by vehicle geometry. The preferred embodiment of the invention is to have each panel, comprising the invention, located near the outboard side edge of the vehicle base and extending vertically from the lower edge of the base surface to the upper edge of the base surface. The trailing edge shape of each panel pair shall be the same and is a function of vehicle geometry and operating conditions. Panel trailing edge shape may be either linear and parallel to the vehicle base surface or may be defined as a complex geometric shape such as serrated, notched, curved, or sawtooth shape to stabilize the wake shed from the panel trailing edge. The leading edge of each panel may be offset from the vehicle base surface to create a vent slot that will allow the high pressure air located inboard of the panel to flow outward to the low pressure region outboard of the panel. The leading edge of each panel may be notched or offset from the vehicle base surface to provide clearance of existing vehicle structures and mechanisms.

The subject invention is designed to be a maintenance free device that does not interfere with typical operational procedures or add additional operational procedures to ensure successful operation of the device. For ground vehicles, such as tractor-trailer trucks, which have a single roll-up door or two swing doors located on the vehicle base, each panel of the subject invention is attached to the base by means of an actuation/attachment system that may consist of a spring-hinge or the combination of a simple hinge with either a pneumatic spring or mechanical support system. For vehicles with two swing doors on the base a single panel would be attached to each vehicle door or attached to the swing door hardware. The actuation/attachment system is designed to prohibit the panel from rotating outward but allows the panel to rotate inwards 90° towards the vehicle centerline. Each panel is attached with either a spring hinge or a simple hinge with pneumatic spring that allows the panel to rotate 90° to its stowed position when the swing door is opened and rotated about its hinges an angle greater than 180°. When the door is rotated past 180° the panel trailing edge contacts the vehicle side exterior surface. As the door is rotated to 270° the spring-hinge system allows the panel to rotate 90° to the stowed position. To ensure that there is no damage to the vehicle side surface the trailing edge of the panels incorporate either a rolling device(s), low friction wear pad(s), or the trailing edge of each panel comprising the invention is composed of a material that would not damage the vehicle side surface. The side surface of the vehicle that would make contact with each panel comprising the invention is configured to eliminate damage that may result from the impact of the panel on the vehicle side surface. The spring coefficient for the spring-hinge or pneumatic spring is designed to; position each panel in the deployed position when the doors are closed and to minimize the force required to rotate the vehicle door 270° to its open and stowed position.

For vehicles with a rollup door on the base a single panel is installed on the vehicle by means of a partial swing door system. The partial swing door system would attach to the vehicle roll-up door frame and operate as a typical swing door. The partial swing door system would be capable of rotating 270° outward when the door is to be opened and the panel is stowed. The lateral positioning requirement of the subject panels defines the inboard extent of the partial swing door system. Each panel of the subject invention is attached to the partial swing door system by means of a spring-hinge system or other suitable means that allows for the required operation of the panel. The spring-hinge panel attachment system is designed to prohibit the panel from rotating outward but allows the panel to rotate inwards 90° towards the vehicle centerline, from the deployed position of perpendicular to the vehicle base. The 90° rotation of the panel to its stowed position is automatically accomplished when the partial swing door is opened and rotated about its hinges an angle greater than 180° at which point the panel trailing edge contacts the vehicle side exterior surface. The spring-hinge system allows the panel to rotate 90° to the stowed position when the vehicle partial swing door is opened to its stowed position of 270°. To ensure that there is no damage to the vehicle side surface the trailing edge of the panels incorporate either a rolling device(s), low friction wear pad(s), or the trailing edge of each panel comprising the invention is composed of a material that would not damage the vehicle side surface. The side surface of the vehicle that would make contact with each panel comprising the invention is configured to eliminate damage that may result from the impact of the panel on the vehicle side surface. The spring coefficient for the spring-hinge or pneumatic spring is designed to; position each panel in the deployed position when the partial swing doors are closed and to minimize the force required to rotate the vehicle door 270° to its open and stowed position.

The reduction of aerodynamic drag, improved operational performance and improved stability of multiple component vehicles is obtained by increasing the pressure loading on the bluff base of the vehicle or vehicle component. The pressure loading on the bluff base is increased by eliminating the interaction of the side edge separated flow structures and promoting the side and top surface flow to smoothly transition from the vehicle trailing edges and turn into the wake region. The flow control is accomplished by trapping a vortex structure on the outward facing surface of each panel, increasing circulation at the panel trailing edge by venting the inboard high pressure outboard, and energizing the panel trailing edge flow to promote inboard turning of the flow. The invention creates a virtual extension of the vehicle side surfaces thereby allowing the flow to exit the vehicle side surface and flow into the wake. More specifically, this invention relates to a device and method for reducing aerodynamic drag utilizing two opposing, symmetrically positioned, and minimum length and width panels that are specifically shaped, sized, and orientated to inhibit the formation and prohibit the interaction of large separated flow structures in the wake. The invention creates a virtual surface that acts as an extension of the vehicle side surfaces resulting in a stabilization of the vehicle wake, reduced unsteady flow separation, increased pressures acting on the bluff base area and reduced vehicle aerodynamic drag. The structure and segmentation of the two panels, the lateral positioning of the panels, the streamwise extent of the panels, the vertical extent of the panels, the vent gap size, and the trailing edge shape of the panels are the primary design variables that are used to determine the drag reduction capability of the device.

The invention may be used to reduce the drag of all existing and future ground vehicles (i.e., cars with trailers, tractor-trailer trucks, trains, etc.).

Objects and Advantages

Several objects and advantages of the present invention are:

(a) to provide a novel process to reduce the aerodynamic drag of vehicles;
(b) to provide a means to use vortex flow to reduce aerodynamic drag;
(c) to provide a means to use flow venting to reduce aerodynamic drag;
(d) to provide a means to reduce the aerodynamic drag and improve the operational efficiency of vehicles;
(e) to provide a means to reduce the aerodynamic drag and improve the fuel efficiency of vehicles;
(f) to provide a means to conserve energy and improve the operational efficiency of vehicles;
(g) to provide a means to reduce the aerodynamic drag without a significant geometric modification to existing vehicles;
(h) to provide an aerodynamic drag reduction device that uses a minimum number of panels;
(i) to allow the geometric details of each pair of panels to be variable to meet the specific needs of the application;
(j) to allow the spacing, location, and orientation of each pair of panels to be variable to meet the specific needs of the application;
(k) to create a high pressure and low aerodynamic drag forces on the bluff base of a vehicle to reduce the aerodynamic drag of the subject vehicle;
(l) to allow the device to be fabricated as a number of independent segments and parts that may be applied to an existing vehicle;
(m) to allow the device to be fabricated as a single independent unit that may be applied to an existing vehicle;
(n) to allow the device to be fabricated as an integral part of a vehicle;
(o) to allow for optimal positioning of each panel on the vehicle base surface;
(p) to have minimum weight and require minimum volume within the vehicle;

(q) to have the ability to automatically fold to a stowed position and deploy to a operational position with normal operational of the door system;

(r) to have minimum maintenance requirements;

(s) to have no impact on operational requirements.

Further objects and advantages are to provide a device that can be easily and conveniently used to minimize aerodynamic drag on any ground vehicle for the purposes of improving the operational performance of the vehicle. Still further objects and advantages will become apparent from a consideration of the ensuing description and drawings.

DETAILED DESCRIPTION OF THE INVENTION

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many shapes, widths, leading edge shapes, spacing and orientation of the forward extended plurality of panels, candidate vehicles that can benefit from the device, fabrication means and material, attachments means and material should be understood to fall within the scope of the present invention.

Referring now in detail to the drawings, like numerals herein designate like numbered parts in the figures.

Figure 1:
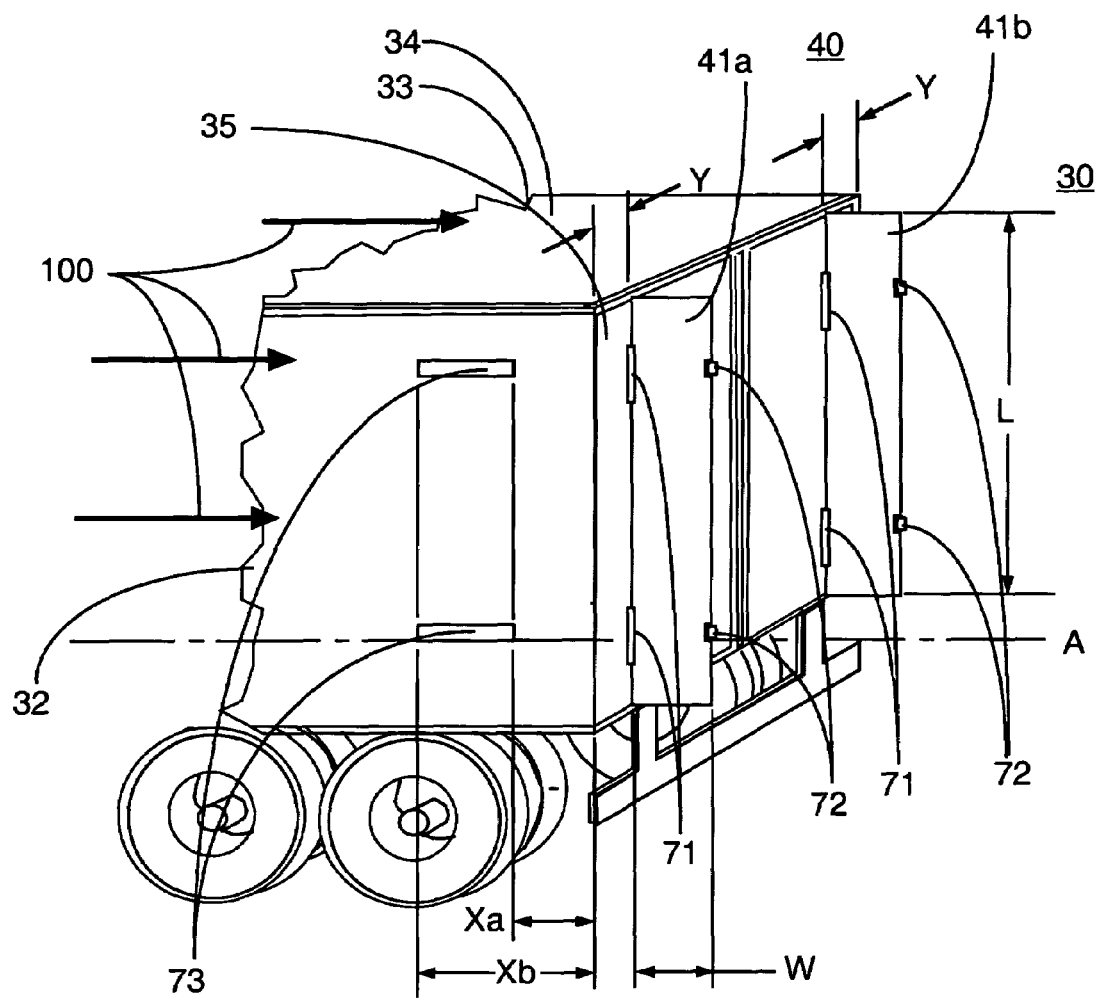
FIG. 1 is a rear perspective view of the aft most portion of a trailer of a tractor-trailer truck system with the subject invention installed on the rear surface and side surface of the trailer.

FIG. 1 is a rear perspective view of the aft portion of a typical trailer 30 with sides 32 and 33, upper surface 34, and rear surface 35. During operation of the trailer there exist flow 100 passing over the trailer 30. FIG. 1 show the trailer 30 with the subject invention installed on the rear surface 35 of a trailer 30. The invention 40 is comprised of two panels 41*a* and 41*b*, attachment/actuation hardware 71, roller or low friction pad to assist in stowage of panel 72, and low friction landing strip 73 that is mounted to the sides 32, 33 of the vehicle 30. The subject invention is comprised of two aft-extended panels 41*a* and 41*b* that are attached to vehicle base surface 35. The two panels 41*a* and 41*b* are symmetrically positioned about the vehicle vertical plane of symmetry. Each panel has a width W and a length L and is inset from the vehicle side edge a distance Y, where Y may be any between 0.0 and 10.0 percent of the vehicle width. The self-stowage feature of the invention 40 is accomplished when the panels 41*a* and 41*b*, or roller 72, contacts the vehicle side surface 32, 33. To facilitate the folding process and to minimize damage to the vehicle 30 a low friction landing strip 73 may be mounted to the side 32, 33 of the vehicle 30. The location of the landing strips 73 is defined by a leading edge position Xb and a trailing edge position Xa.

The length L of each panel 41*a* and 41*b* of the invention 40 is equivalent to the full vertical height of the vehicle 30. The width W of each panel 41*a* and 41*b* of the invention 40 is determined by the geometric characteristics of the vehicle 30, the operational requirements of the vehicle 30 and the maintenance requirements of the vehicle 30 and is in the range of 15 to 25 percent of the vehicle width. The type, size and structure of the attachment/actuation hardware 71 of the invention and the type, size and structure roller/low friction hardware 72, 73 of the invention is determined by the geometric characteristics of the vehicle 30, the operational requirements of the vehicle 30 and the maintenance requirements of the vehicle 30.

The subject invention 40, comprised of components 41, 71, 72, 73, provides aerodynamic drag reduction for all free stream flow 100 conditions including crosswind conditions. Aerodynamic drag reduction occurs when flow 100 that separates at the vehicle side surface 32, 33 trailing edge and is turned into the base wake region with the use of vortex trapping, flow venting and trailing edge energizing flow control technologies. The flow 100 leaving the side surface 32, 33 trailing edge forms a vortex that reside on the outward facing surface of panels 41*a* and 41*b*. The trapped vortex located on panels 41*a* and 41*b* acts as a fluidic surface to the external flow that is turned into the wake region. The trapped vortices promote the turning of the external flow into the base wake region which results in a stable bluff-base wake flow and a high pressure that acts on the base surface 35 of the trailer 30. The strength of the trapped vortices located on panels 41*a* and 41*b* will provide increasing aerodynamic drag reduction with increasing velocity of the flow 100. The effectiveness of the subject invention to reduce drag and thereby increase fuel economy of a vehicle is determined by panel 41 width W, length L, position Y, trailing edge shape, micro vortex strake placement and vent gap as shown in FIG. 4.

FIG. 2*a* through FIG. 2*d* show flow patterns in the wake of a bluff-base tractor-trailer truck with and without the present invention installed. In FIG. 2*a* through FIG. 2*d* the airflow about the vehicle and in the base region is represented by arrow tipped lines and swirl structures 100, 110, 120, and 130. The shaded swirl structures represent rotational wake flow 110. The small swirl structures represent turbulent flow structures 120 in the base area and from the vehicle undercarriage. The spiral structures represent trapped vortices 130.

Figure 2A:
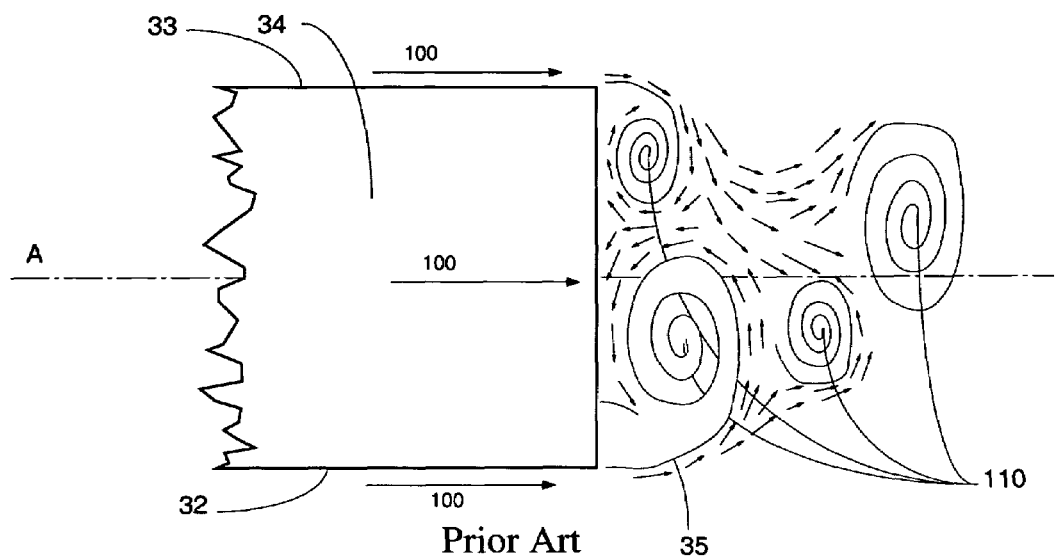
FIG. 2*a* to 2*b* are cross section views, in planes horizontal to the ground and perpendicular to the ground, of the wake flow conditions for a tractor-trailer system without the subject invention installed.

FIG. 2a show a cross section view, in a plane horizontal to the ground, of the aft portion of a trailer 30 and the bluff-base wake flow, without the subject invention installed. For this condition, a surface flow 100 develops on the trailer that separates at the trailing edge of the side surfaces 32 and 33, and forms rotational-flow structures 110 that comprise the bluff-base wake flow. The rotational-flow structures 110 are shed asymmetrically from the opposing side surfaces 32 and 33. These rotational-flow structures 110 continue to move downstream in a random pattern. The asymmetric shedding of the rotational-flow structures 110 produce low pressures that act on the base surface 35 of the trailer. These low pressures result in a high aerodynamic drag force. The low energy flow 100 separating at the trailing edges of the side surfaces 32 and 33 of the trailer 30 is unable to energize and stabilize the low energy bluff-base wake flow. The resulting bluff-base wake-flow structure emanating from the base area of the vehicle is comprised of the vortex structures 110 that are shed from trailing edges of the side surfaces 32 and 33 of the trailer 30. Contributing to the low-energy bluff-base wake is the low-energy turbulent flow 120 that exits from the vehicle undercarriage at the base of the vehicle.

Figure 2B:
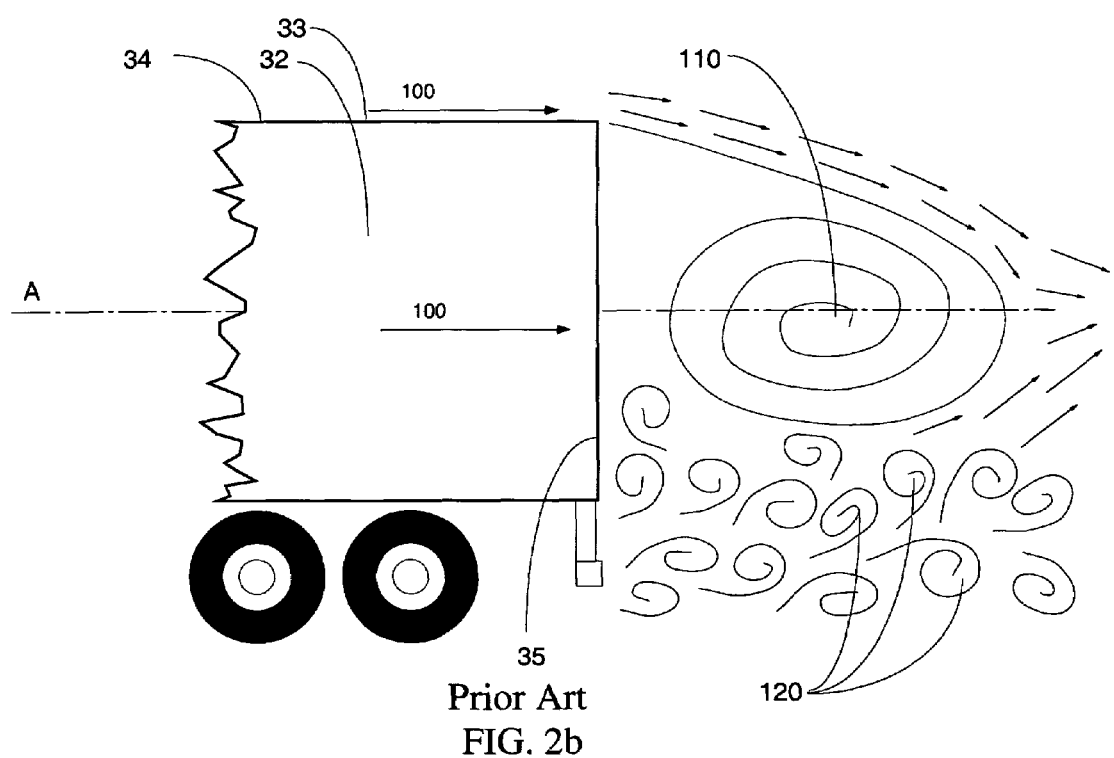

FIG. 2b show a centerline cross section view of the aft portion of a trailer 30 and the bluff-base wake flow, without the subject invention installed. For this condition, a surface flow 100 develops on the trailer that separates at the trailing edge of the top surface 34 and forms rotational-flow structures 110 that comprise the bluff-base wake flow. The rotational-flow structures 110 that are shed from the trailing edge of the top surface 34 are asymmetrically located in the wake. These rotational-flow structures 110 continue to move downstream in a random pattern. The unsteady shedding of the rotational-flow structures 110 produce low pressures that act on the base surface 35 of the trailer. These low pressures result in a high aerodynamic drag force. The low energy flow 100 separating at the trailing edges of the top surface 34 of the trailer 30 is unable to energize and stabilize the low energy bluff-base wake flow. Contributing to the low-energy bluff-base wake is the low-energy turbulent flow 120 that exits from the vehicle undercarriage at the trailing edge of the vehicle. The resulting bluff-base wake-flow structure emanating from the base area of the vehicle is comprised of the vortex structures 110 that are shed from trailing edges of the side surfaces 32 and 33 and the top surface 34 of the vehicle. The low-energy turbulent flow 120 that exists from the vehicle undercarriage also enters into the bluff-base wake flow. The unsteady wake flow imparts a low pressure onto the aft facing surface 35 of the trailer base that results in significant aerodynamic drag.

Figure 2C:
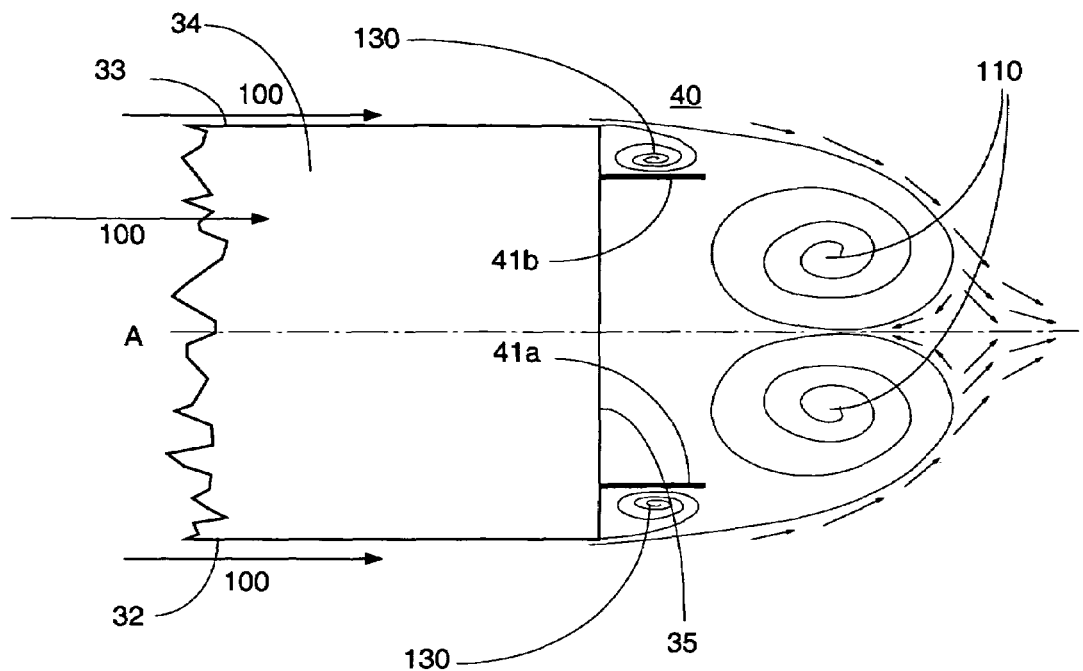
FIG. 2*c* to 2*d* are cross section views, in planes horizontal to the ground and perpendicular to the ground, of the wake flow conditions for a tractor-trailer system with the subject invention installed
Figure 2D:
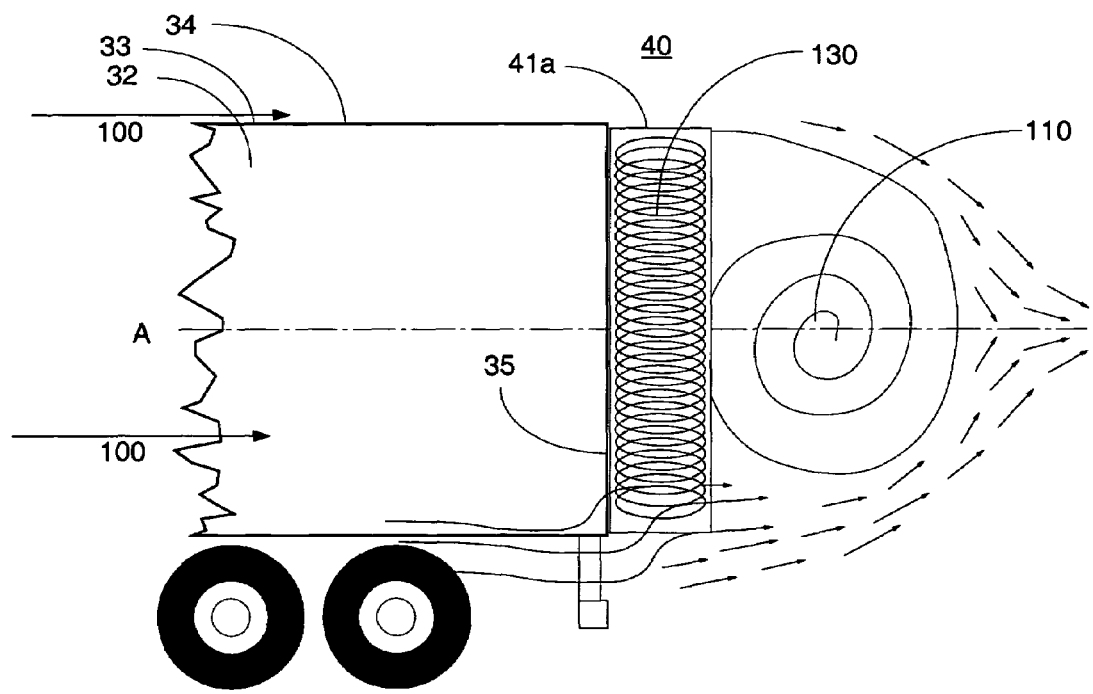

FIG. 2c and FIG. 2d show a top view and a side view of the aft portion of a trailer 30 and cross section views, in a plane horizontal to the ground and along the vehicle centerline, of the bluff-base wake flow, with the subject invention 40 installed. The figure shows a surface flow 100 develops on the trailer 30 top surface 34 and side surfaces 32 and 33 that separates at the side and top surface trailing edges. The top surface flow 100 separates at the top surface 33 trailing edge and spills into the base wake region. This top surface flow is at a low energy state and is characterized by large unsteady vortical flow structures. In contrast the side surface flow 100 that separates at the side surface trailing edge is trapped as a vortex 130 on the outward facing surface of the invention 40. The side flow 100 that is external to the trapped vortex 130, is turned into the wake region by the trapped vortex 130. The turning angle and velocity of the side flow is a function of the strength of the trapped vortex 130 as well as various modifications to the panel 41 geometry. Increasing the side surface 32 and 33 flow inboard turning angle and velocity allows for a reduction in the width W of each panel 41a and 41b which will allow for the side surface 32 and 33 flow to turn into the base wake upstream of the top surface 33 flow that is spilling into the base wake region. This effect will shield the base wake region from the unsteady character of the top surface 33 flow and thereby increase the base surface 35 pressure and reduce drag.

Figure 3A:
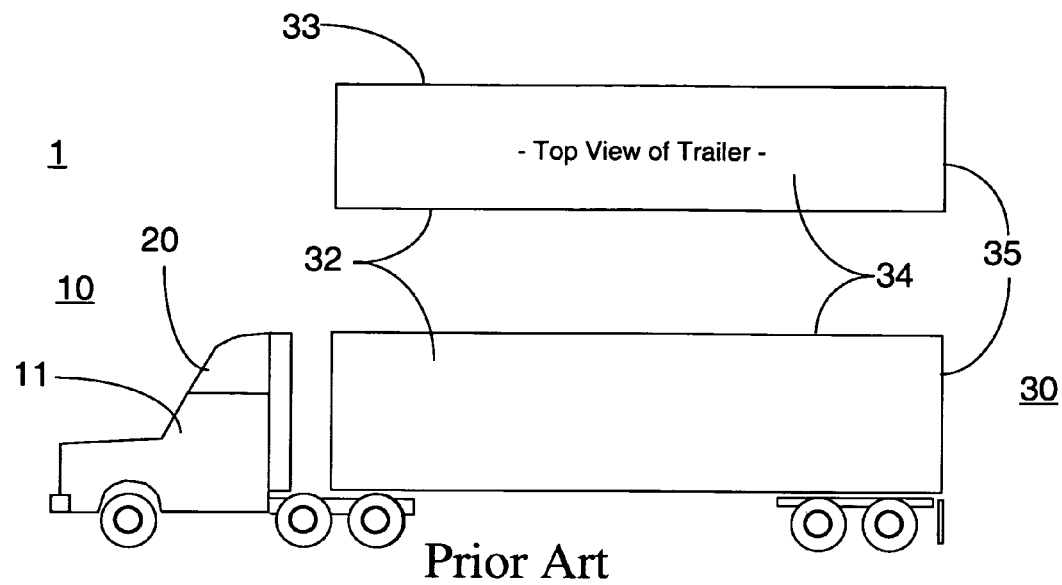
FIG. 3*a* to 3*d* are side and top views of various ground vehicles with and without the subject invention installed.
Figure 3B:
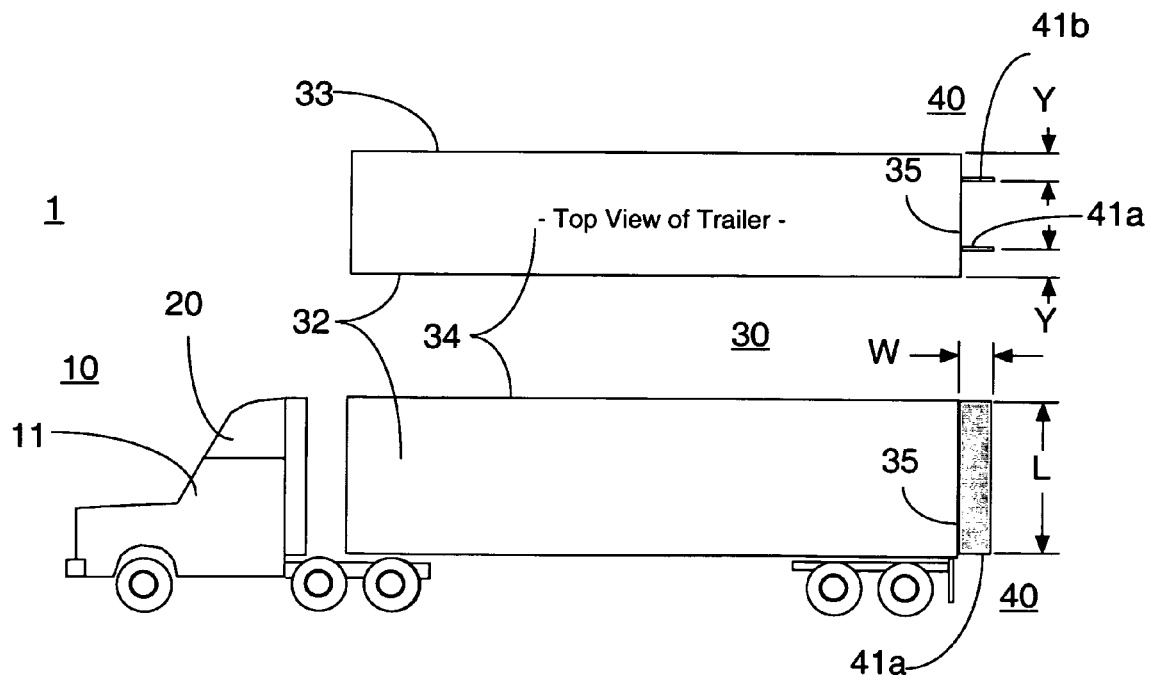
Figure 3C:
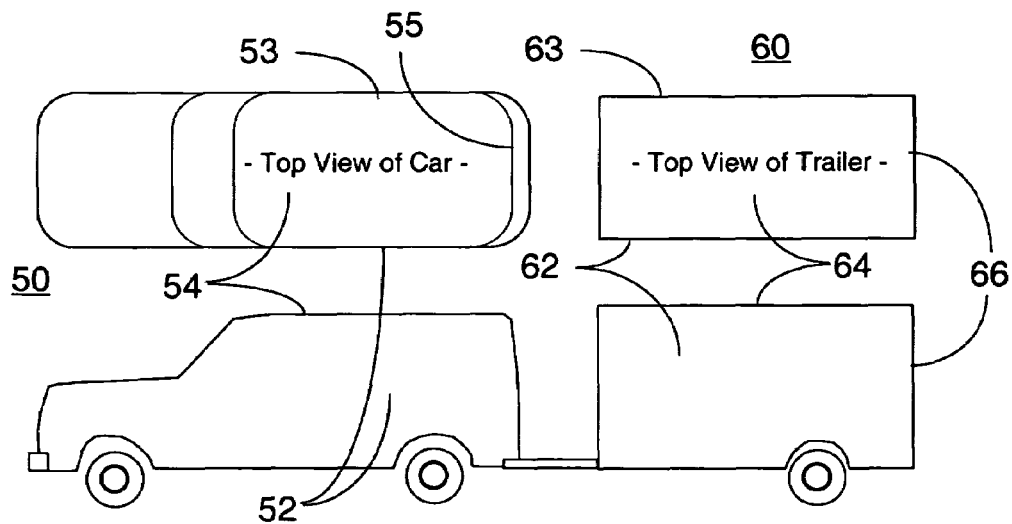
Figure 3D:
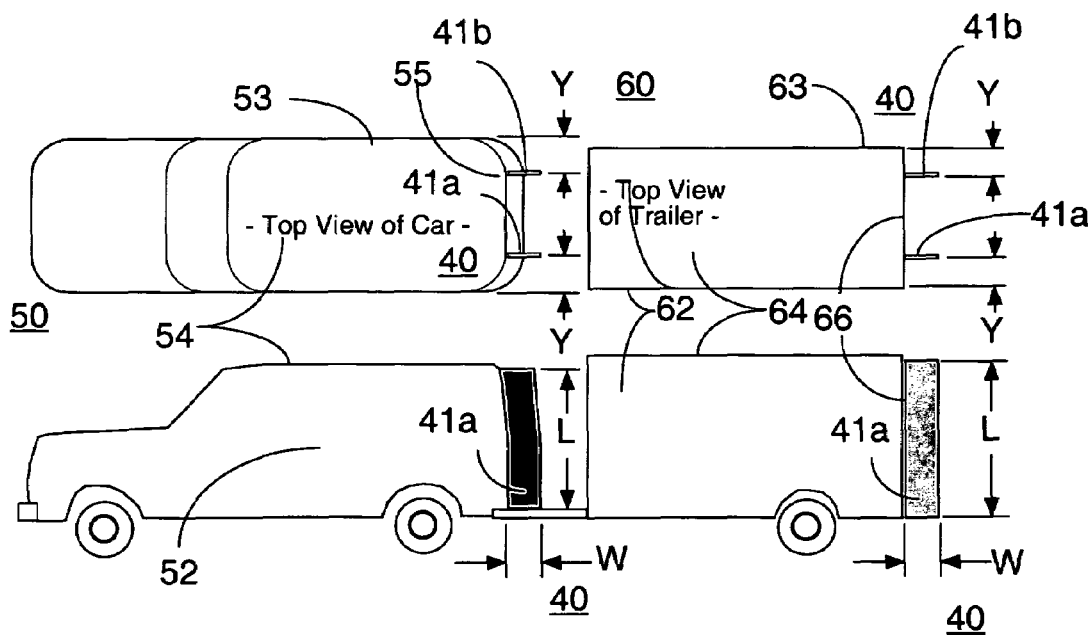

FIG. 3a through FIG. 3d are side and top views of example ground vehicles with and without the subject invention installed. FIG. 3a shows a typical tractor-trailer truck system 1, comprised of a powered tractor 10 that pulls a trailer 30. The trailer has a top surface 34 and two side surface 32 and 33, and a rear surface 35. The tractor 10 is comprised of a cab 11 and an aerodynamic fairing system 20 that may be an integral part of the tractor 10. FIG. 3b shows the same tractor-trailer truck system 1 as that of FIG. 3a with the subject invention 40 installed on rear surface 35 of the trailer 30. The subject invention consists of two aft extending panels 41a and 41b. The two aft extended panels 41a and 41b that comprise the invention 40 are symmetrically positioned about the centerline of the trailer 30. FIG. 3c and FIG. 3d show an automobile 50 pulling a trailer 60 with and without the subject invention 40 installed on both the automobile rear surface 55 and the trailer rear surface 66. The automobile has a top surface 54 and two side surfaces 52 and 53, and a rear surface 55. The trailer has a top surface 64 and two side surfaces 62 and 63, and a rear surface 65. FIG. 3d shows the same automobile 50 pulling a trailer 60 as that of FIG. 3c with the subject invention 40 installed on rear surface 35 of the trailer 30. The subject invention consists of two aft extending panels 41a and 41b. The two aft extended panels 41a and 41b that comprise the invention 40 are symmetrically positioned about the centerline of the trailer 30. The various vehicles depicted in FIG. 3 shows a powered vehicle towing/pulling an un-powered towed vehicle. Additionally, other multiple component vehicles may be considered than those depicted.

FIG. 4a through FIG. 4h are three views of eight different panel geometry types; baseline panel 41a, notched panel 42a, sawtooth panel 43a, curved panel 44a, stall strip panel 45a, gurney panel 46a, vented panel 47a and panel with micro vortex strakes installed 48a. Additional panel types may be defined by combining the baseline panel 41, the notched panel 42, sawtooth panel 43, curved panel 44, stall strip panel 45, gurney panel 46, the vented panel 47, and the micro vortex strake panel 48.

Figure 4A:
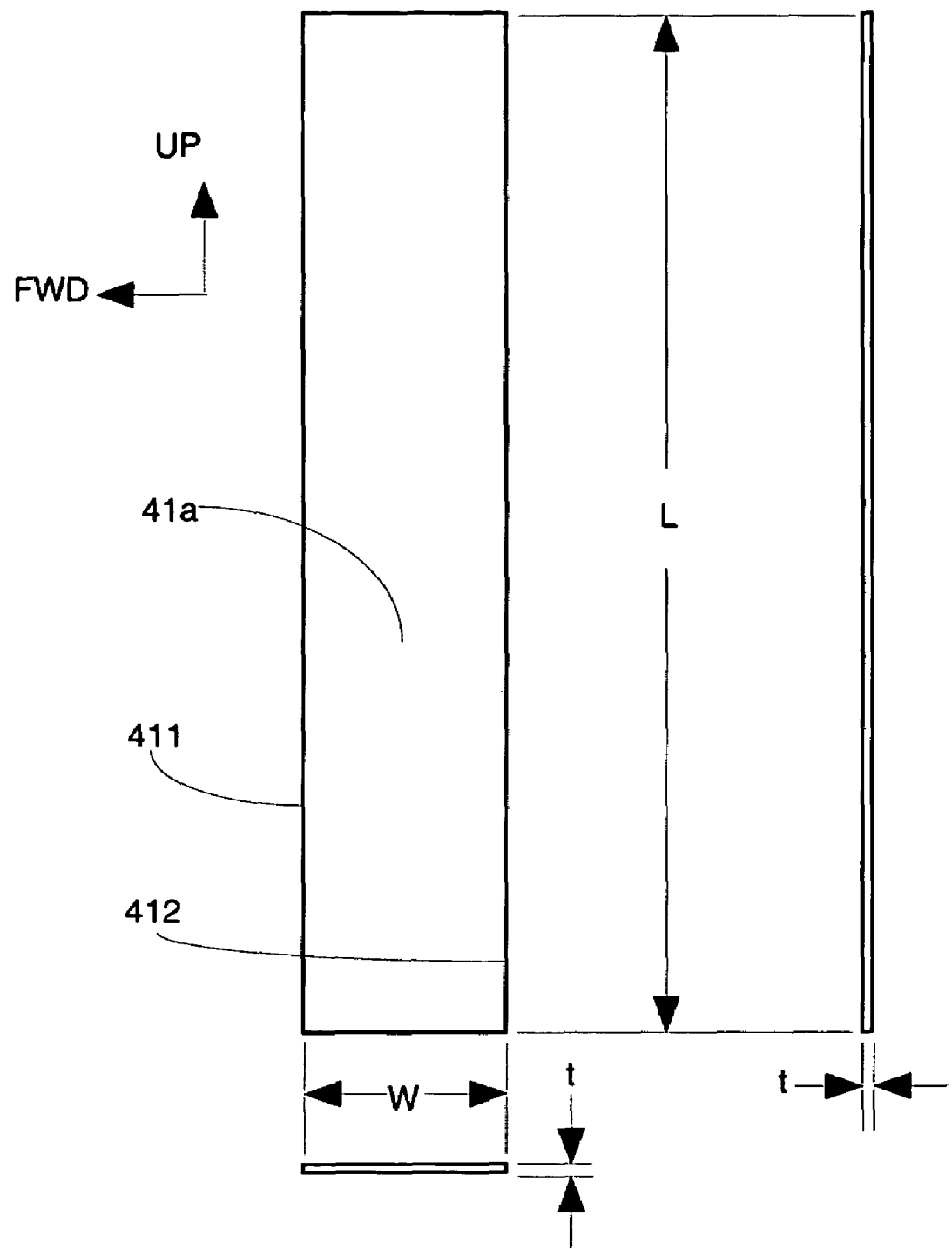
FIG. 4*a* to 4*h* are three views drawings of the various panel leading edge and trailing edge treatment concepts.

FIG. 4a is a three view of the baseline panel 41. Shown in the figure is the right side panel 41a. The baseline panel 41 is a rectangular shaped panel with width W, length L, and thickness t. The baseline panel 41 has a linear trailing edge 411 and linear leading edge 412 that abuts the rear surface 35 of a vehicle. The width W of the baseline panel 41 is between 15 and 25 percent of the vehicle width. The length L of the baseline panel 41 is equal to or less than the height of the vehicle base area.

Figure 4B:
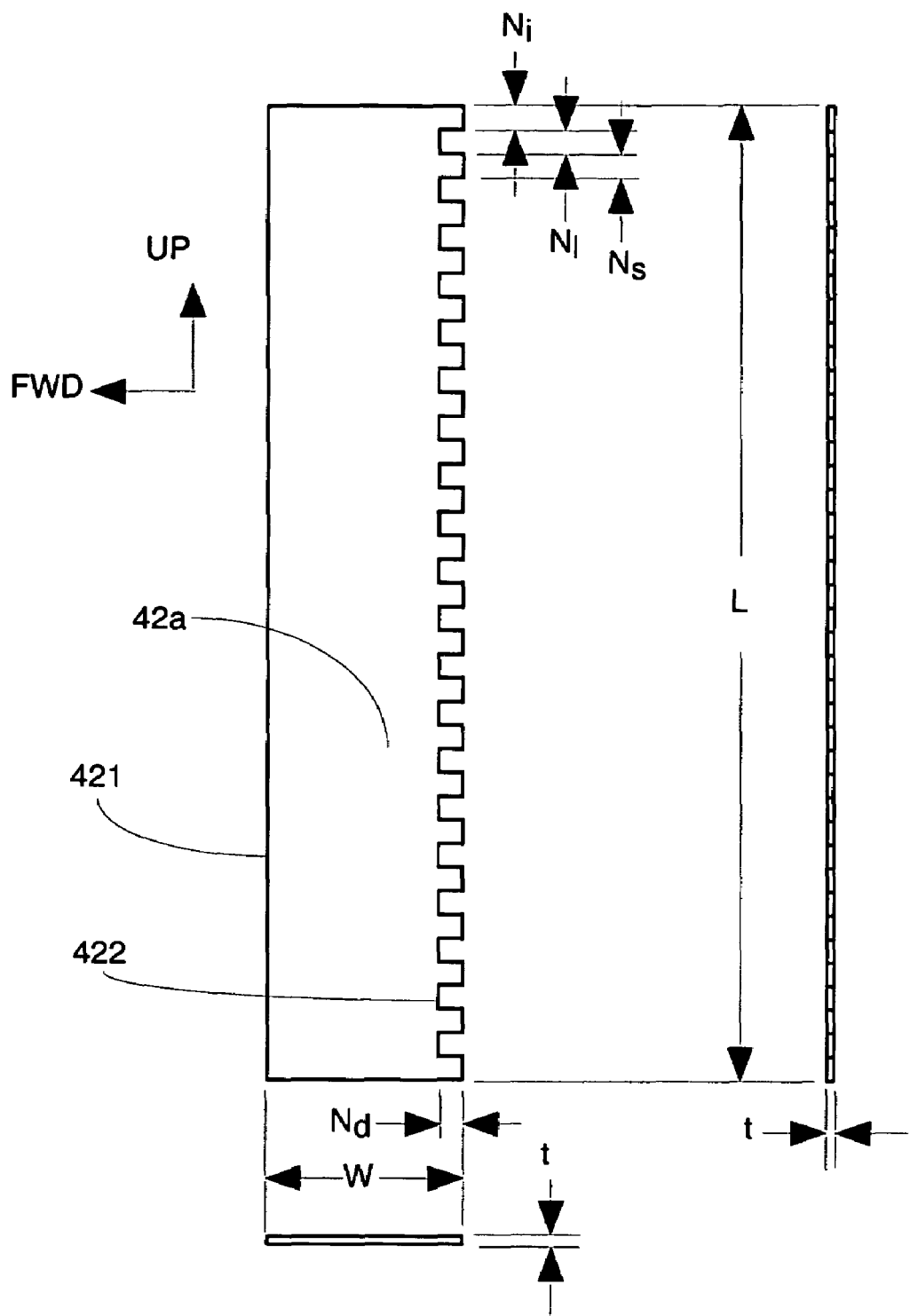

FIG. 4b is a three view of the notched panel 42. Shown in the figure is the right side panel 42a. The notched panel 42 is a rectangular shaped panel with width W, length L, and thickness t. The notched panel 42 has a notched trailing edge 421 and linear leading edge 422 that abuts the rear surface 35 of a vehicle 30. The width W of the notched panel 42 is between 15 and 25 percent of the vehicle width. The length L of the notched panel 42 is equal to or less than the height of the vehicle base area. The notch geometry is defined by a notch depth Nd, notch length Nl, notch spacing Ns, and notch inset Nl. The notched panel 42 parameters notch depth Nd, notch length Nl, notch spacing Ns, and notch inset Ni have a maximum value of 10 percent of the panel length L. The definition of the notch geometry is a function of the vehicle geometry, vehicle operational requirements, and vehicle maintenance requirements.

Figure 4C:
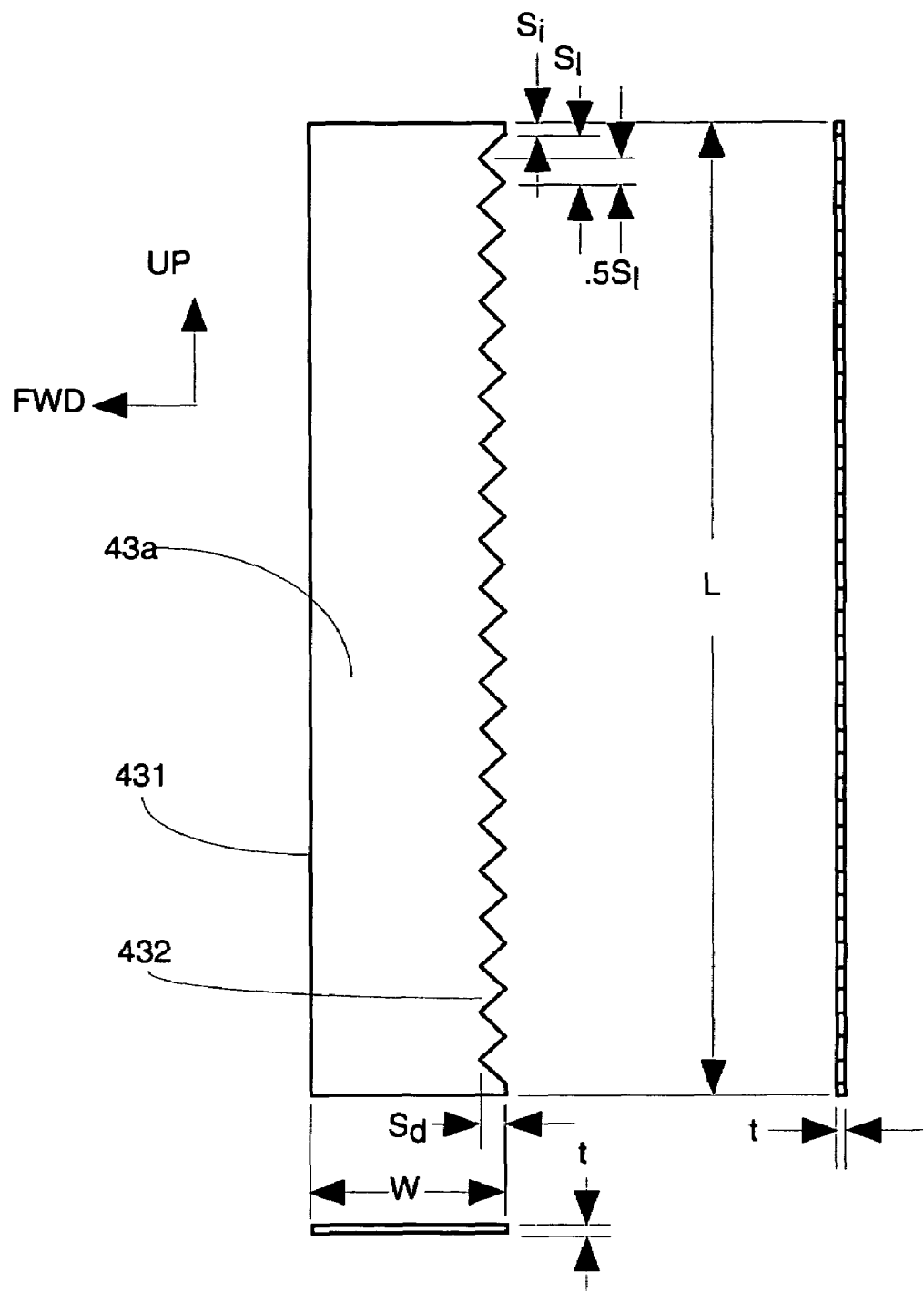

FIG. 4c is a three view of the sawtooth panel 43. Shown in the figure is the right side panel 43a. The sawtooth panel 43 is a rectangular shaped panel with width W, length L, and thickness t. The sawtooth panel 43 has a sawtooth trailing edge 431 and linear leading edge 432 that abuts the rear surface 35 of a vehicle 30. The width W of the sawtooth panel 43 between 15 and 25 percent of the vehicle width. The length L of the sawtooth panel 43 is equal to or less than the height of the vehicle base area. The sawtooth geometry is defined by a sawtooth depth Sd, sawtooth length Sl, and sawtooth inset Si. The sawtooth panel 43 parameters sawtooth depth Sd, sawtooth length Sl, and sawtooth inset Si have a maximum value of 10 percent of the panel length L. The definition of the sawtooth geometry is a function of the vehicle geometry, vehicle operational requirements, and vehicle maintenance requirements.

Figure 4D:
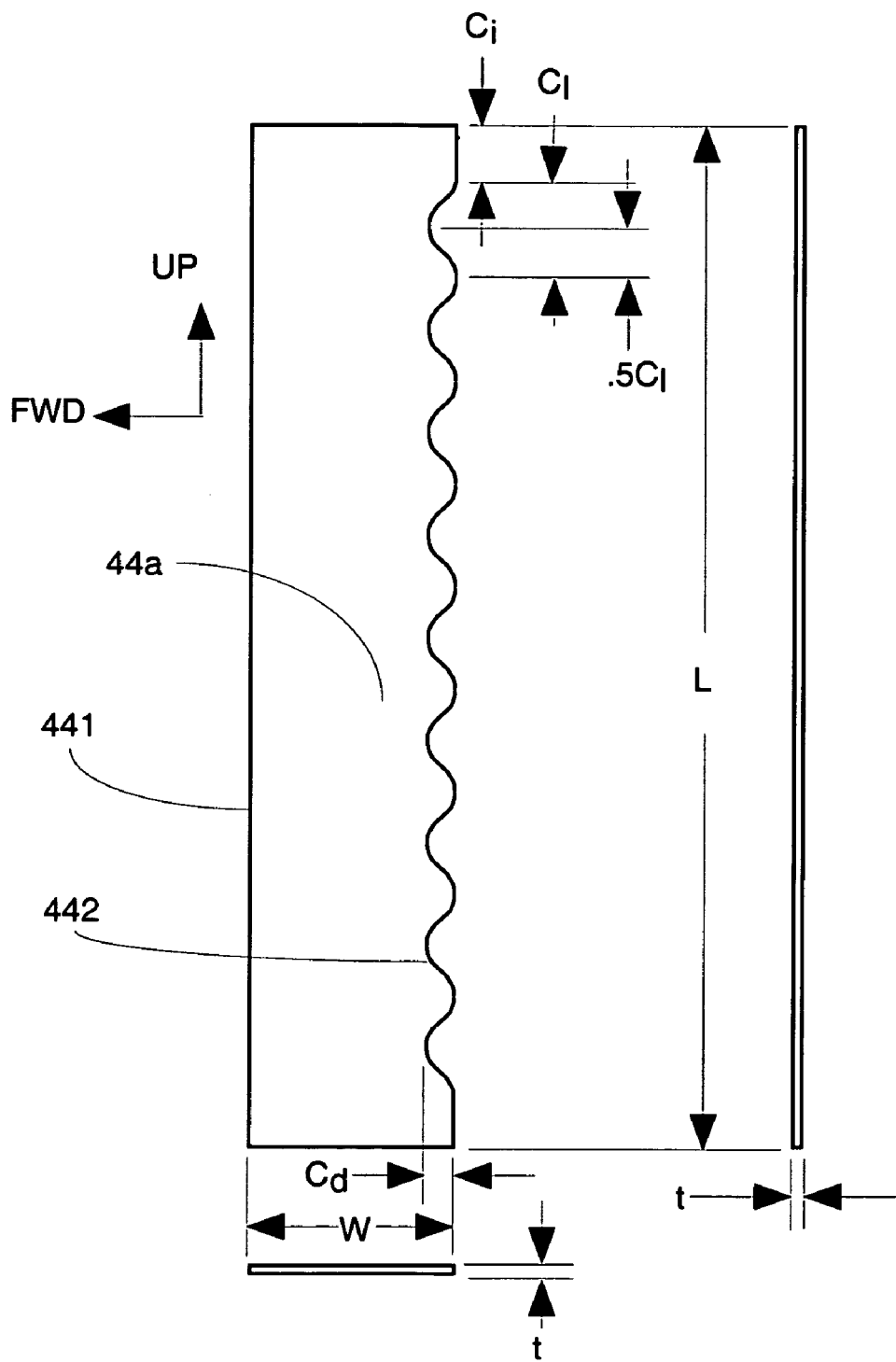

FIG. 4d is a three view of the curved panel 44. Shown in the figure is the right side panel 44a. The curved panel 44 is a rectangular shaped panel with width W, length L, and thickness t. The curved panel 44 has a curved trailing edge 441 and linear leading edge 442 that abuts the rear surface 35 of a vehicle 30. The width W of the curved panel 44 is between 15 and 25 percent of the vehicle width. The length L of the curved panel 44 is equal to or less than the height of the vehicle base area. The curved geometry is defined by a curve function Cf that is based upon a curve depth Cd, curve length Cl, and curve inset Ci. The curved panel 44 parameters curve depth Cd, curve length Cl, and curve inset Ci have a maximum value of 10 percent of the panel length L. The definition of the curved geometry is a function of the vehicle geometry, vehicle operational requirements, and vehicle maintenance requirements.

Figure 4E:
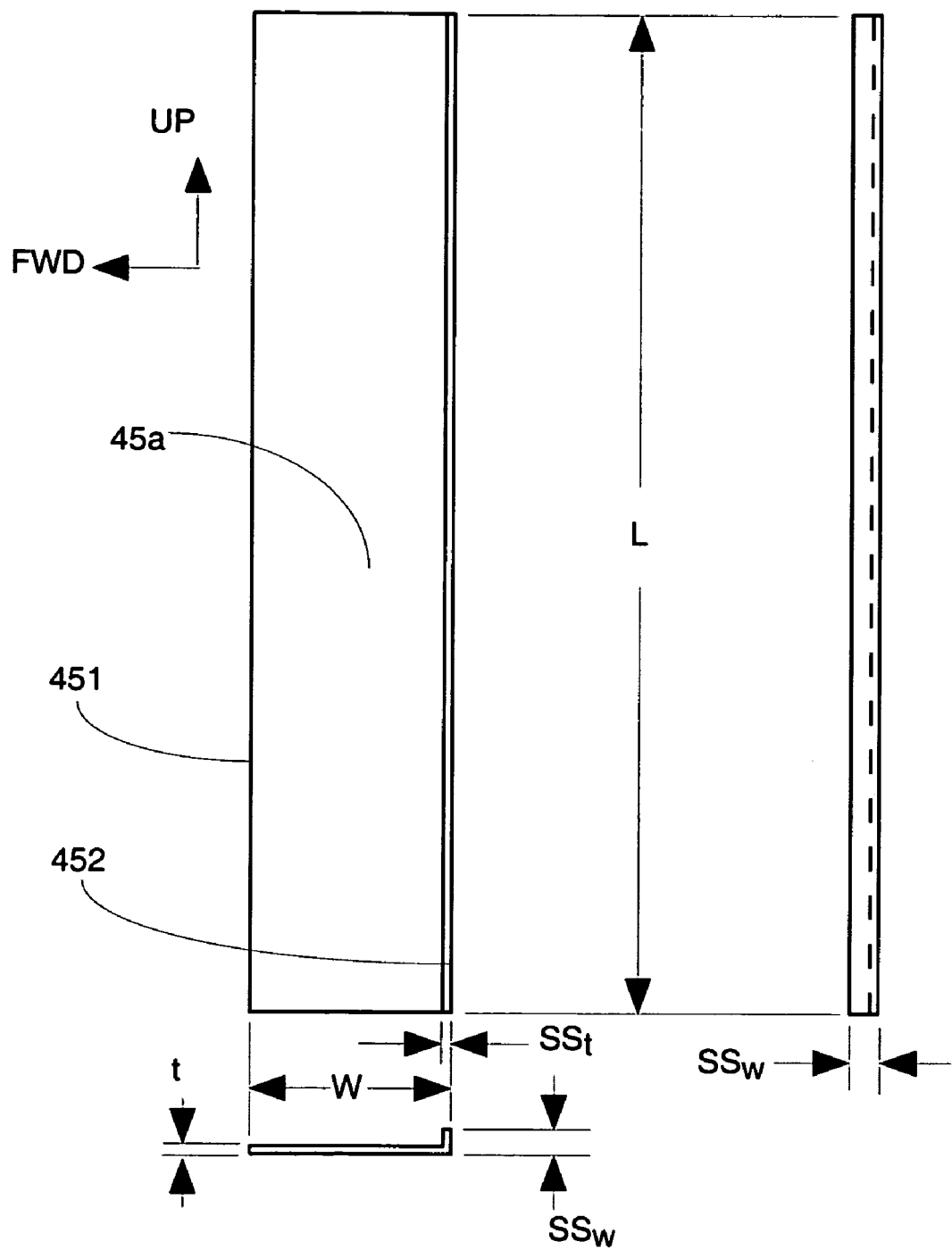

FIG. 4e is a three view of the stall strip panel 45. Shown in the figure is the right side panel 45a. The stall strip panel 45 is a rectangular shaped panel with width W, length L, and thickness t. The stall strip panel 45 has a stall strip trailing edge 451 and linear leading edge 452 that abuts the rear surface 35 of a vehicle 30. The width W of the stall strip panel 45 is between 15 and 25 percent of the vehicle width. The length L of the stall strip panel 45 is equal to or less than the height of the vehicle base area. The stall strip geometry is defined by a stall strip thickness SSt and stall strip width SSw. The parameter SSw has a maximum value 10 percent panel width W and the parameter SSt has a maximum value equivalent to the panel thickness t. The definition of the stall strip geometry is a function of the vehicle geometry, vehicle operational requirements, and vehicle maintenance requirements.

Figure 4F:
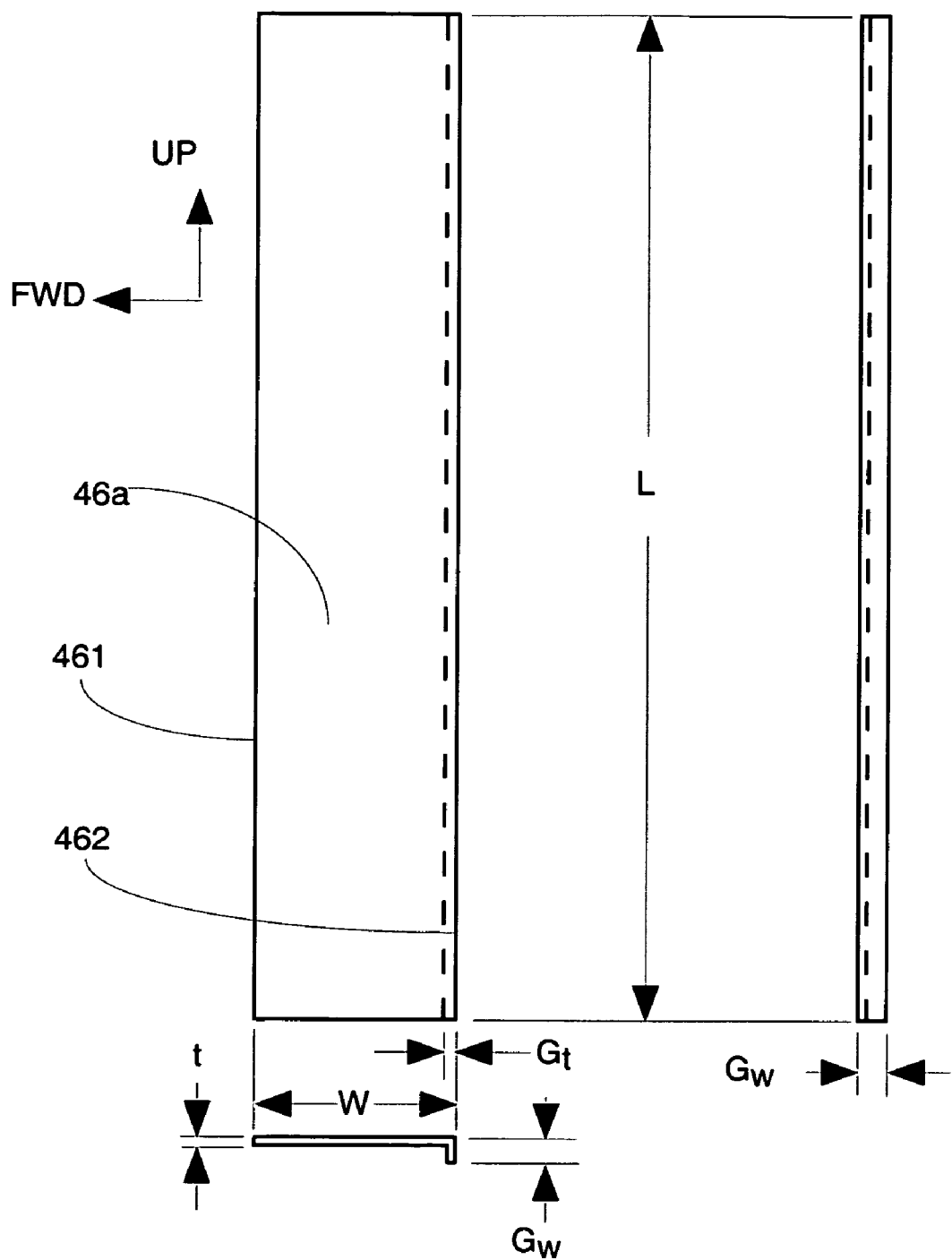

FIG. 4f is a three view of the gurney panel 46. Shown in the figure is the right side panel 46a. The gurney panel 46 is a rectangular shaped panel with width W, length L, and thickness t. The gurney panel 46 has a gurney trailing edge 461 and linear leading edge 462 that abuts the rear surface 35 of a vehicle 30. The width W of the gurney panel 46 is between 15 and 25 percent of the vehicle width. The length L of the gurney panel 46 is equal to or less than the height of the vehicle base area. The gurney geometry is defined by a gurney thickness Gt and gurney width Gw. The parameter Gw has a maximum value 10 percent panel width W and the parameter Gt has a maximum value equivalent to the panel thickness t. The definition of the gurney geometry is a function of the vehicle geometry, vehicle operational requirements, and vehicle maintenance requirements.

Figure 4G:
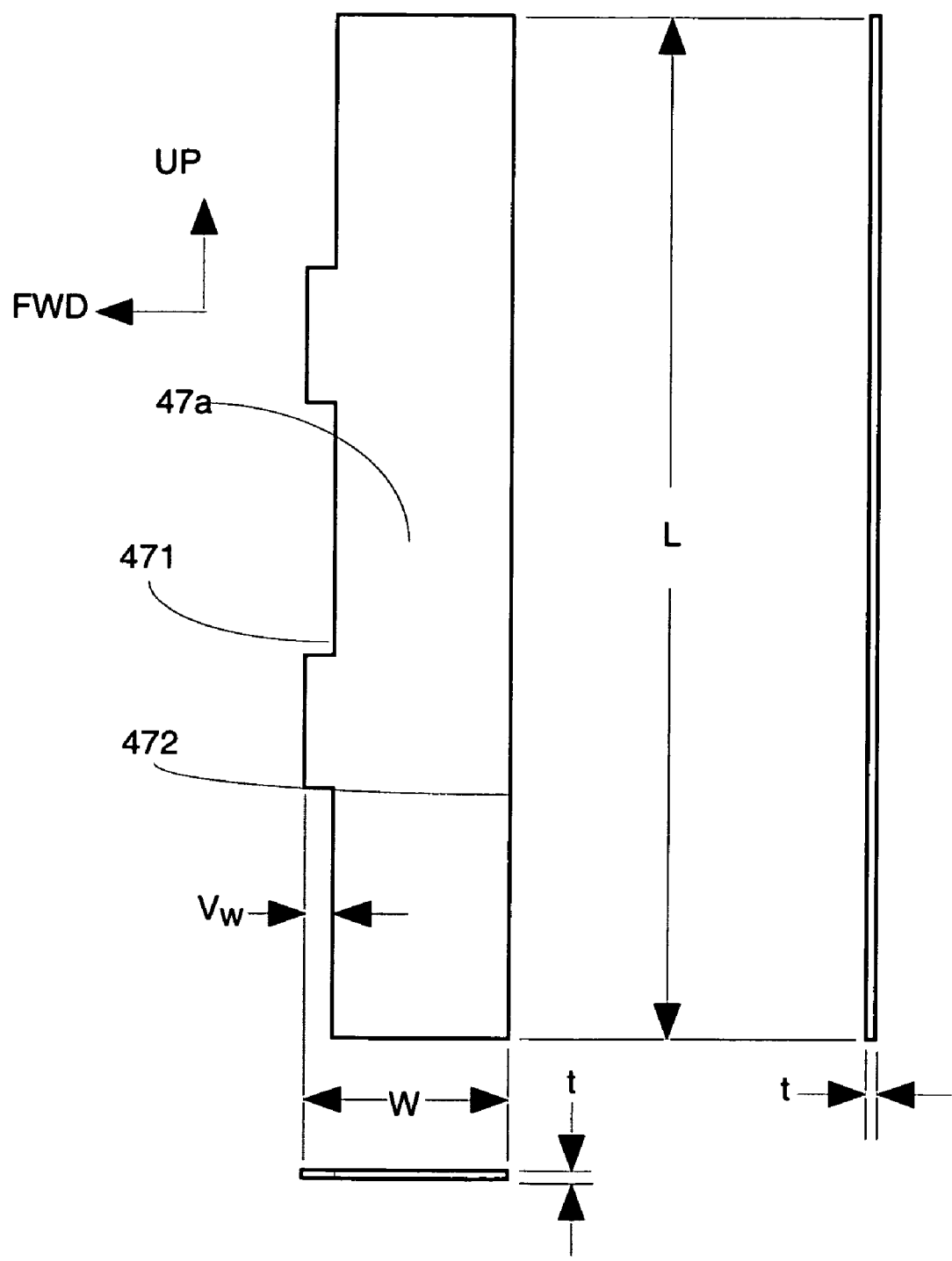

FIG. 4g is a three view of the vented panel 47. Shown in the figure is the right side panel 47a. The vented panel 47 is a rectangular shaped panel with width W, length L, and thickness t. The vented panel 46 has a linear or treated trailing edge 471 and vented leading edge 472 that does not abut the rear surface 35 of a vehicle 30. The width W of the vented panel 47 is between 15 and 25 percent of the vehicle width. The length L of the vented panel 47 is equal to or less than the height of the vehicle base area. The vent geometry is defined by a vent width Vw. The vent width parameter Vw has a maximum value of 10 percent of the panel width W. The definition of the vent geometry is a function of the vehicle geometry, vehicle operational requirements, and vehicle maintenance requirements.

Figure 4H:
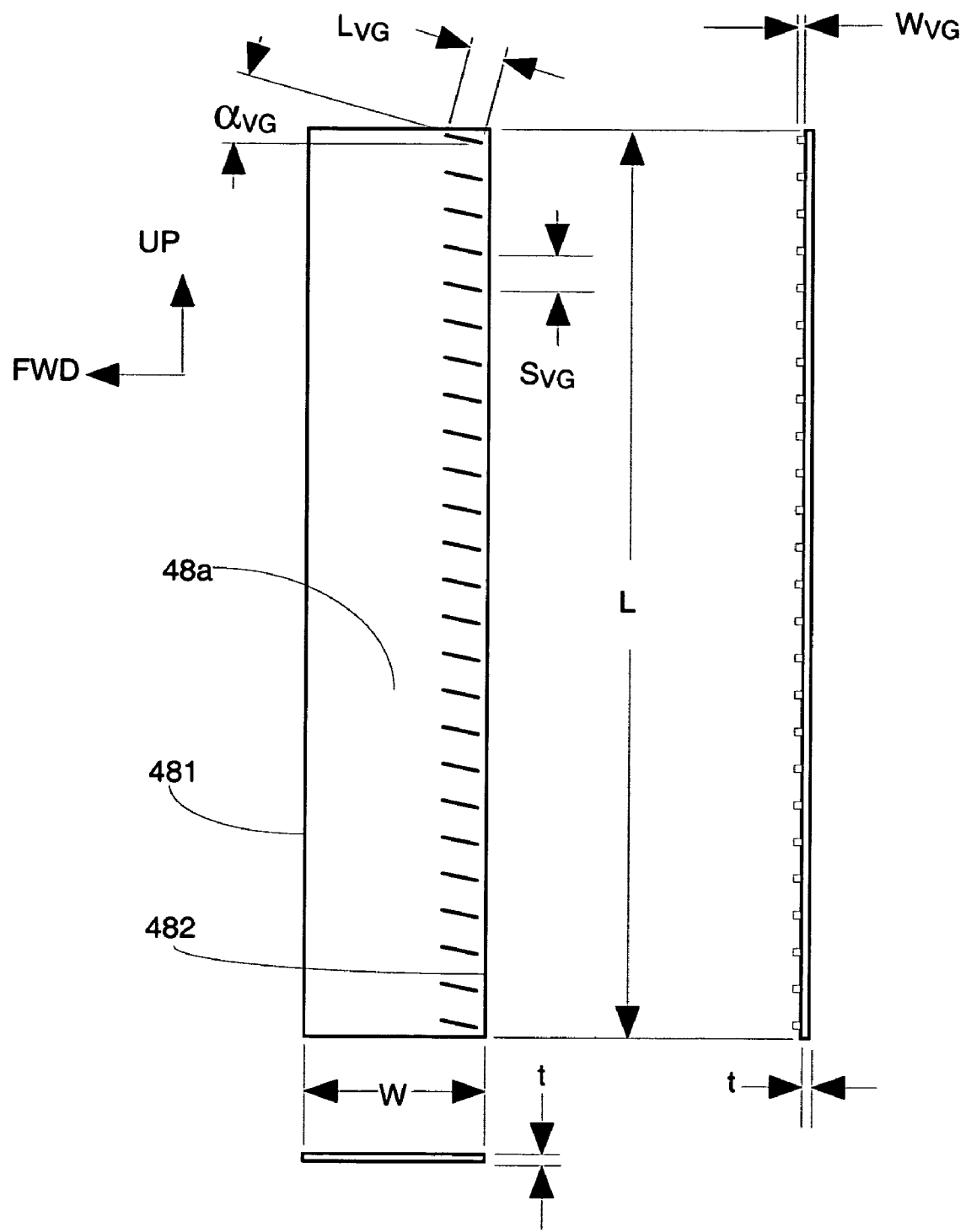

FIG. 4h is a three view of the micro vortex strake panel 48. Shown in the figure is the right side panel 48a. The micro vortex strake panel 48 is a rectangular shaped panel with width W, length L, and thickness t. The micro vortex strake panel 48 has a linear trailing edge 481 and a linear leading edge 482 that abuts the rear surface 35 of a vehicle 30. The micro vortex strake panel has micro vortex strakes installed on the outward facing surface of the panel near the trailing edge. The width W of the micro vortex strake panel 48 is between 15 and 25 percent of the vehicle width. The length L of the micro vortex strake panel 48 is equal to or less than the height of the vehicle base area. The micro vortex strakes are defined by the micro vortex strake width WVG, micro vortex strake length $L_{VG}$, micro vortex strake spacing $S_{VG}$, and micro vortex strake angle $\alpha_{VG}$. The micro vortex strake parameter $W_{VG}$ has a maximum value of 1 percent of the panel width W. The micro vortex strake parameter $L_{VG}$ has a maximum value of 5 percent of the panel width W. The micro vortex strake parameter $S_{VG}$ has a maximum value of 5 percent of the panel width W. The micro vortex strake $\alpha_{VG}$ has a maximum value of 10 degree. The micro vortex strakes geometry is a function of the vehicle geometry, vehicle operational requirements, and vehicle maintenance requirements.

Figure 5:
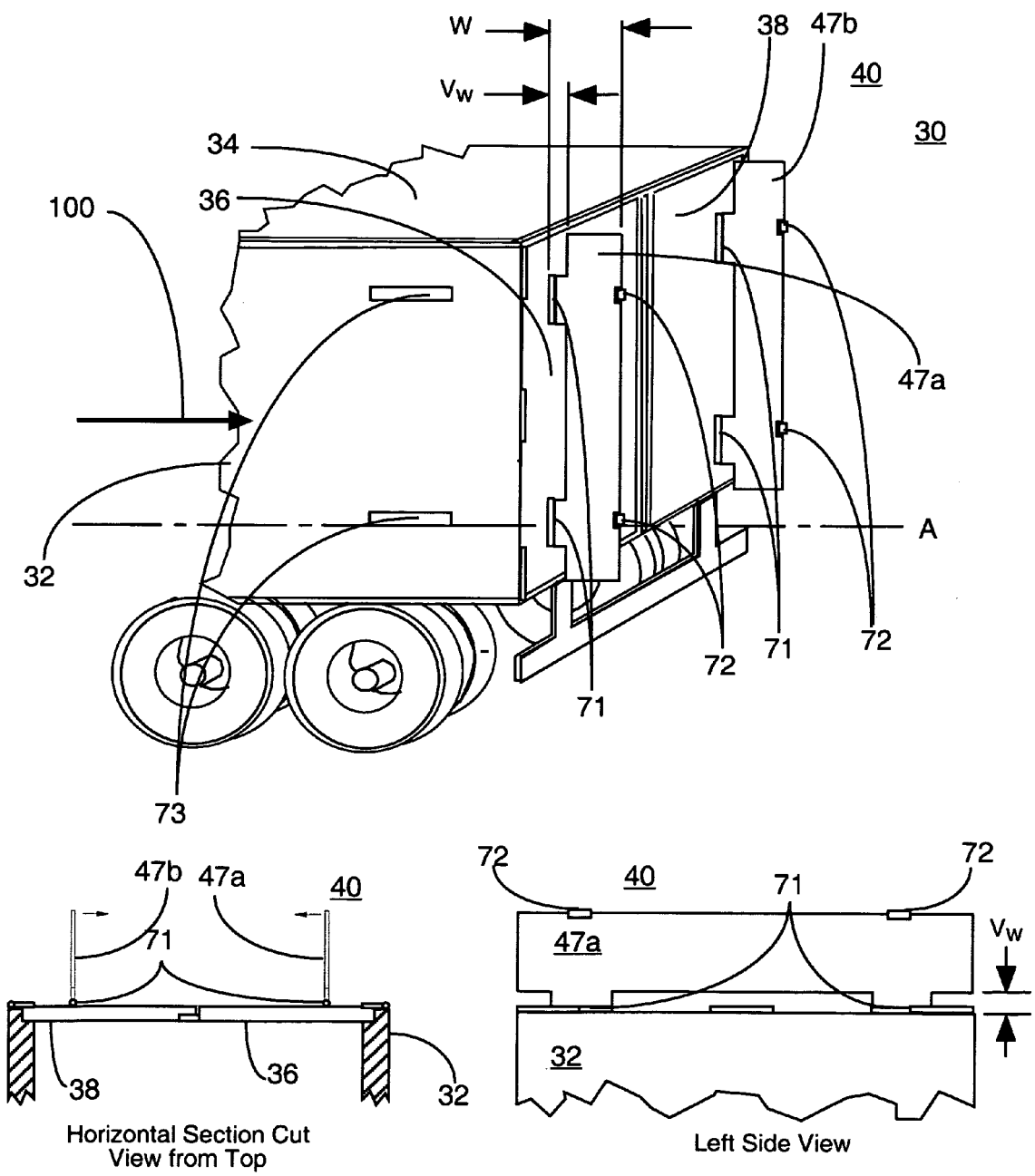
FIG. 5 is a perspective view and cross section views of a vented panel concept installed on the base of a tractor trailer.

FIG. 5 shows a rear perspective view of the aft portion of a typical trailer 30 with a top surface 34 and side surfaces 32 and 33 of a tractor-trailer truck with the subject invention 40 with vented panels 47a and 47b installed on the rear surface 35 of a trailer 30. Also shown is a horizontal section cut through the trailer 30 and subject invention 40 with vented panels 47a and 47b and a side view of the trailer 30 and subject invention 40 with vented panels 47a and 47b. The invention 40 is comprised of two vented panels 47a and 47b, attachment/actuation hardware 71, roller or low friction pad to assist in stowage of panel 72, and low friction landing strip 73 that is mounted to the sides 32, 33 of the vehicle 30.

The length L of each vented panel 47a and 47b of the invention 40 is equivalent to the full vertical height of the vehicle 30. The width W of each panel 41 of the invention 40 is determined by the geometric characteristics of the vehicle 30, the operational requirements of the vehicle 30 and the maintenance requirements of the vehicle 30. The type, size and structure of the attachment/actuation hardware 71 of the invention and the type, size and structure roller/low friction hardware 72, 73 of the invention is determined by the geometric characteristics of the vehicle 30, the operational requirements of the vehicle 30 and the maintenance requirements of the vehicle 30.

The subject invention 40 provides aerodynamic drag reduction for all free stream flow 100 conditions including crosswind conditions. Aerodynamic drag reduction occurs when flow 100 that separates at the vehicle side surface 32, 33 trailing edge and is turned into the base wake region with the use of vortex trapping and flow venting flow control technologies. The flow 100 leaving the side surface 32, 33 trailing edge forms a vortex that reside on the outward facing surface of panel 47. The trapped vortex located on panels 47a and 47b acts as a fluidic surface to the external flow that is turned into the wake region. The trapped vortices promote the turning of the external flow into the base wake region which results in a stable bluff-base wake flow and a high pressure that acts on the base surface 35 of the trailer 30. The strength of the trapped vortices on panels 47a and 47b will provide increasing aerodynamic drag reduction with increasing velocity of the flow 100. The effectiveness of the subject invention to reduce drag and thereby increase fuel economy of a vehicle is determined by panel 47 width W, length L, lateral position Y, trailing edge vent gap Vw.

Figure 6A:
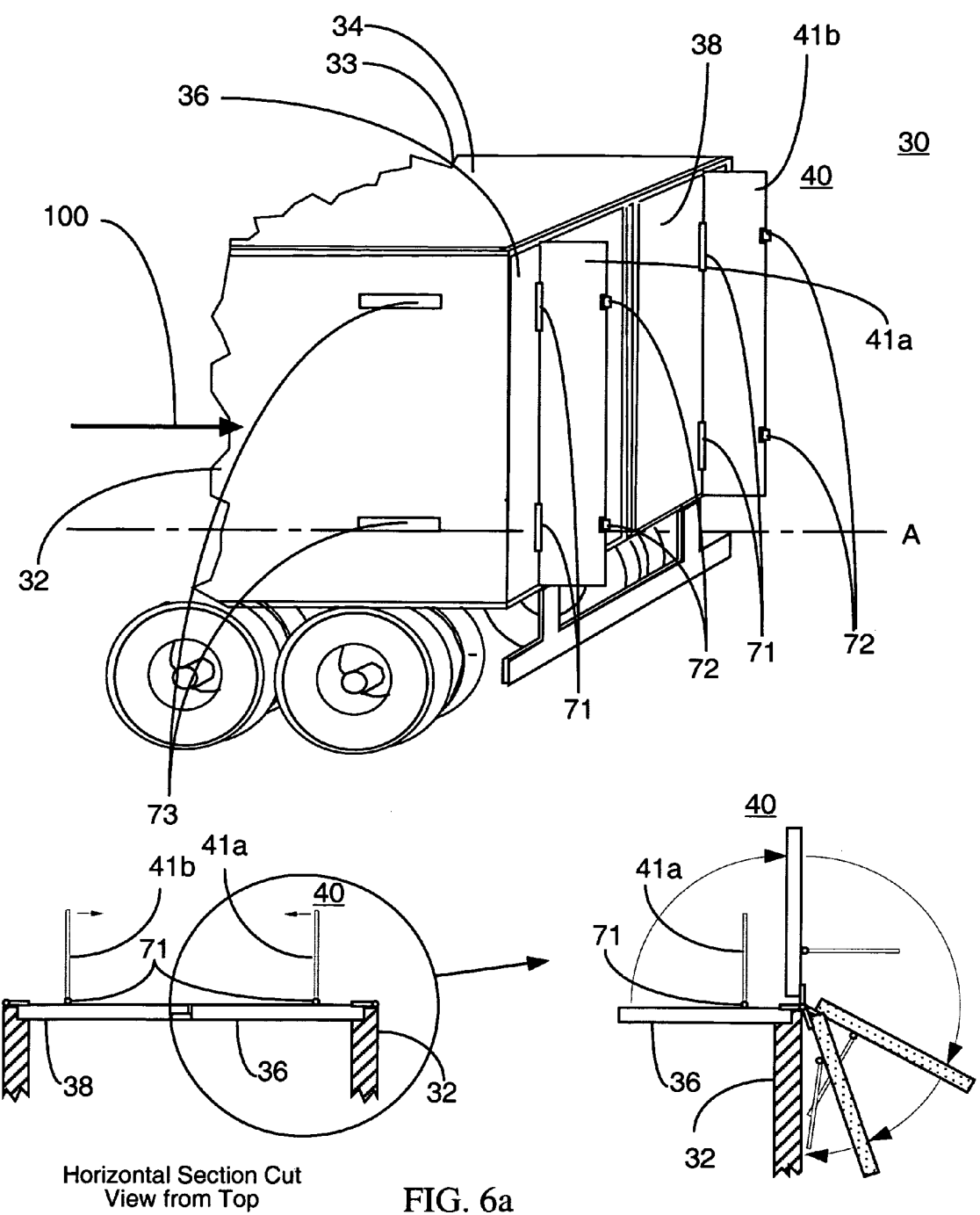
FIG. 6*a* to 6*c* is a perspective view and cross section views of various attachment and actuation concepts for the invention installed on the base of a tractor trailer with swing doors.

FIG. 6a shows a rear perspective view of the aft portion of a typical swing door trailer 30 with top surface 34 and side surfaces 32 and 33 of a tractor-trailer truck with the subject invention 40, configured with a spring hinge 71 attachment/actuation mechanism , installed on the rear swing doors 36 and 38 of a trailer 30. Also shown in FIG. 6a are horizontal section cuts through the trailer 30 and subject invention 40 detailing the stowage of the subject invention 40. The invention 40 is comprised of two panels 41a and 41b, spring hinge attachment/actuation hardware 71, roller or low friction pad 72 to assist in stowage of panels 41a and 41b, and low friction landing strip 73 that is mounted to the sides 32, 33 of the vehicle 30. The self-stowage feature of the invention 40 is accomplished when the panels 41a and 41b, or roller 72, contacts the vehicle side surface 32, 33. To facilitate the folding process and to minimize damage to the vehicle 30 a low friction landing strip 73 may be mounted to the side 32, 33 of the vehicle 30.

The type, size and structure of the spring hinge attachment/actuation hardware 71 of the invention and the type, size and structure roller/low friction hardware 72, 73 of the invention is determined by the geometric characteristics of the vehicle 30, the operational requirements of the vehicle 30 and the maintenance requirements of the vehicle 30.

Figure 6B:
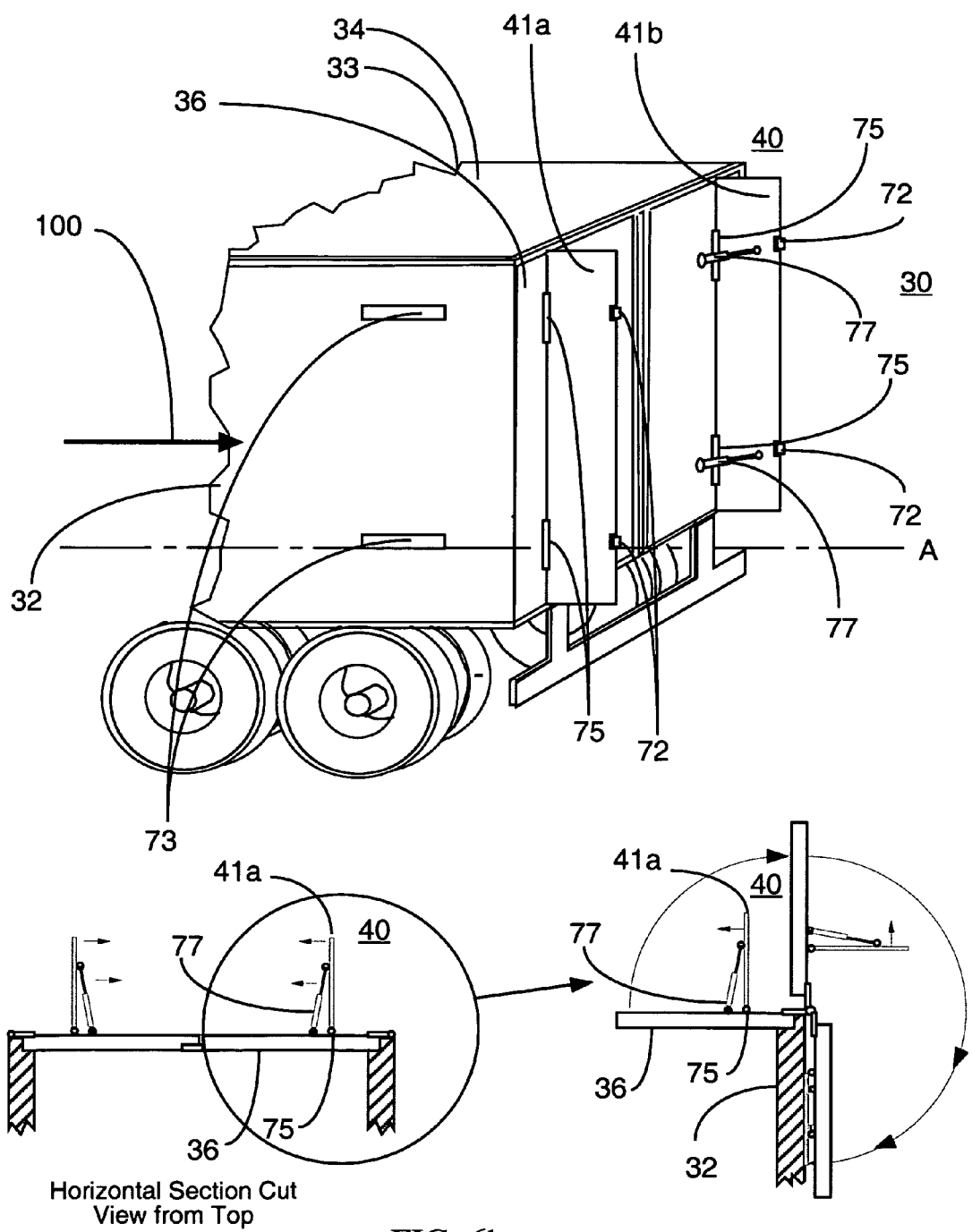

FIG. 6b shows a rear perspective view of the aft portion of a typical swing door trailer 30 with top surface 34 and side surfaces 32 and 33 of a tractor-trailer truck with the subject invention 40, configured with a pneumatic spring 77 actuation mechanism and simple hinge 75 attachment hardware installed on the swing doors 36 and 38 of a trailer 30. Also shown in FIG. 6b are horizontal section cuts through the trailer 30 and subject invention 40 detailing the stowage of the subject invention 40. The invention 40 is comprised of two panels 41a and 41b, pneumatic spring actuation hardware 71, simple hinge 75 attachment hardware, roller or low friction pad 72 to assist in stowage of panels 41a and 41b, and low friction landing strip 73 that is mounted to the sides 32, 33 of the vehicle 30. The self-stowage feature of the invention 40 is accomplished when the panels 41a and 41b, or roller 72, contacts the vehicle side surface 32, 33. To facilitate the folding process and to minimize damage to the vehicle 30 a low friction landing strip 73 may be mounted to the side 32, 33 of the vehicle 30.

The type, size and structure of the pneumatic spring attachment/actuation hardware 71, simple hinge 75 and roller/low friction hardware 72, 73 of the invention is determined by the geometric characteristics of the vehicle 30, the operational requirements of the vehicle 30 and the maintenance requirements of the vehicle 30.

Figure 6C:
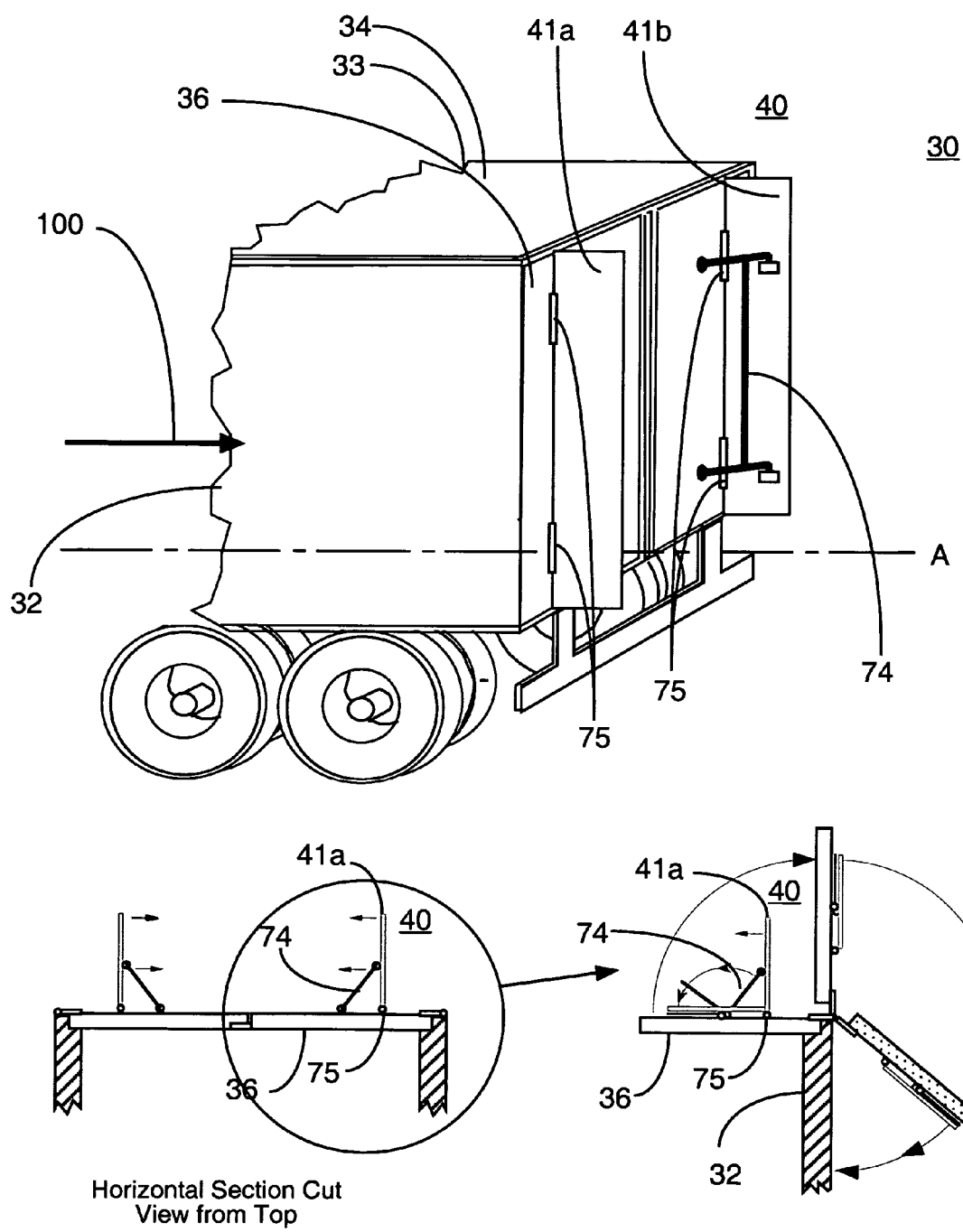

FIG. 6c shows a rear perspective view of the aft portion of a typical swing door trailer 30 with top surface 34 and side surfaces 32 and 33 of a tractor-trailer truck with the subject invention 40, configured with a mechanical support 74 and simple hinge 75 attachment hardware installed on the rear surface 35 of a trailer 30. Also shown in FIG. 6c are horizontal section cuts through the trailer 30 and subject invention 40 detailing the stowage of the subject invention 40. The invention 40 is comprised of two panels 41a and 41b, mechanical support 74, simple hinge 75 attachment hardware, roller or low friction pad 72 to assist in stowage of panels 41a and 41b, and low friction landing strip 73 that is mounted to the sides 32, 33 of the vehicle 30. The self-stowage feature of the invention 40 is accomplished when the panels 41a and 41b, or roller 72, contacts the vehicle side surface 32, 33. To facilitate the folding process and to minimize damage to the vehicle 30 a low friction landing strip 73 may be mounted to the side 32, 33 of the vehicle 30.

The type, size and structure of the mechanical support 74, simple hinge 75 and roller/low friction hardware 72, 73 of the invention is determined by the geometric characteristics of the vehicle 30, the operational requirements of the vehicle 30 and the maintenance requirements of the vehicle 30.

Figure 7:
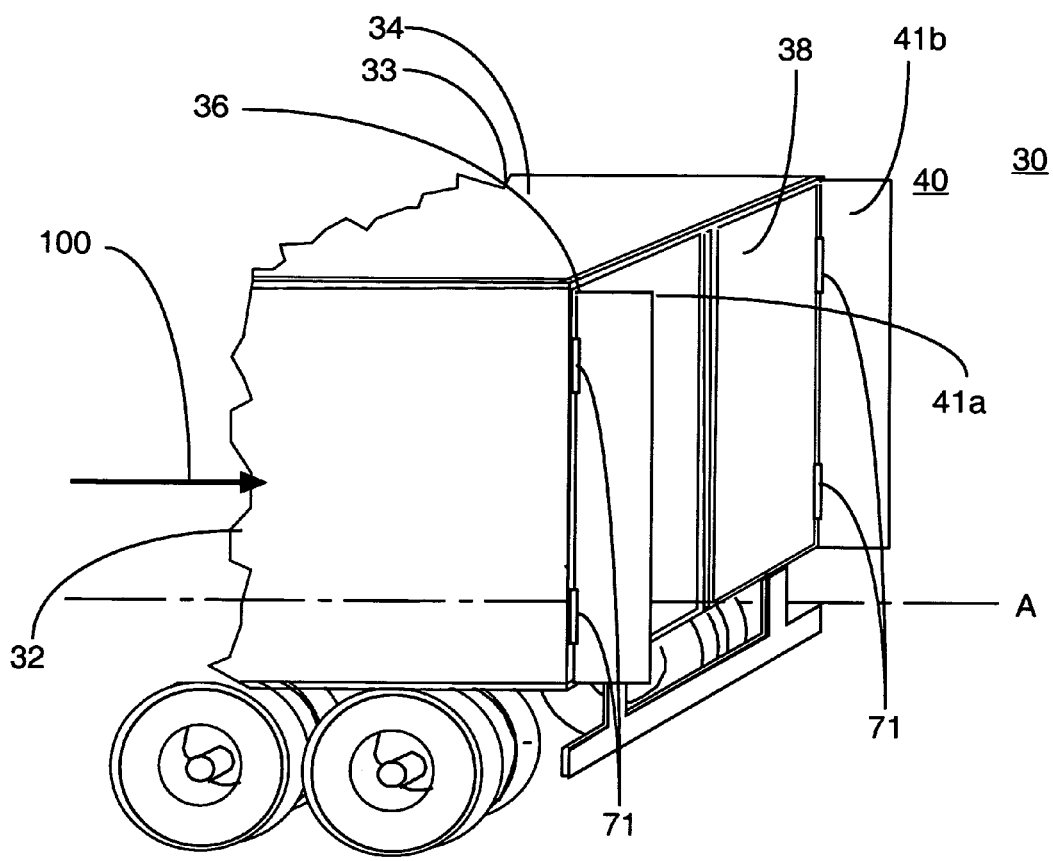
FIG. 7 is a perspective view and cross section views of the invention installed at the base side edge of a tractor trailer with swing doors.
Figure 7:
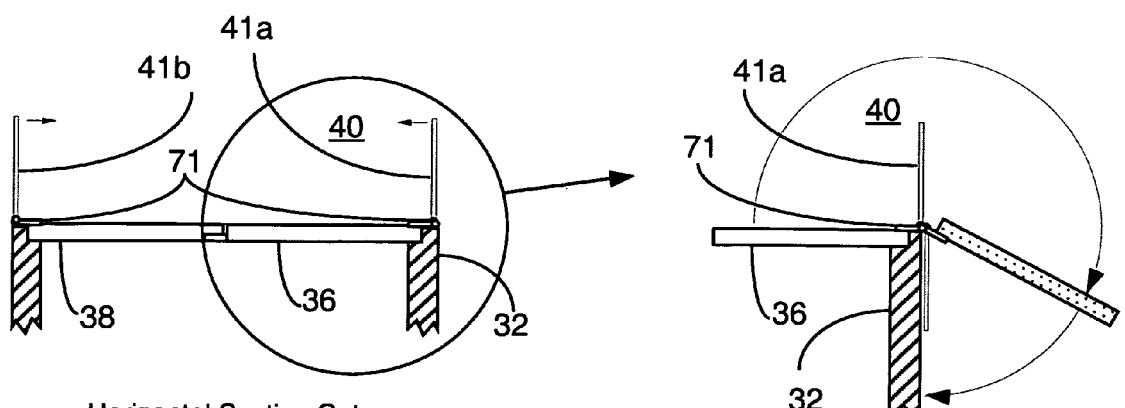

FIG. 7 shows an alternate embodiment of the subject invention. FIG. 7 show a rear perspective view of the aft portion of a typical swing door trailer 30 with top surface 34 and side surfaces 32 and 33 of a tractor-trailer truck with the subject invention 40 installed on the rear doors 36 and 38 of a trailer 30 at the side edge of the trailer 30, without a lateral inset Y. Also shown in FIG. 7 are horizontal section cuts through the trailer 30 and subject invention 40 detailing the stowage of the subject invention 40 from the outboard mounted position, Y=0.0. The invention 40 is comprised of two panels 41a and 41b and spring hinge 71. The self-stowage feature of the invention 40 is accomplished when the panels 41a and 41b contacts the vehicle side surface 32, 33.

The type, size and structure of the spring hinge 71 of the invention is determined by the geometric characteristics of the vehicle 30, the operational requirements of the vehicle 30 and the maintenance requirements of the vehicle 30.

Figure 8:
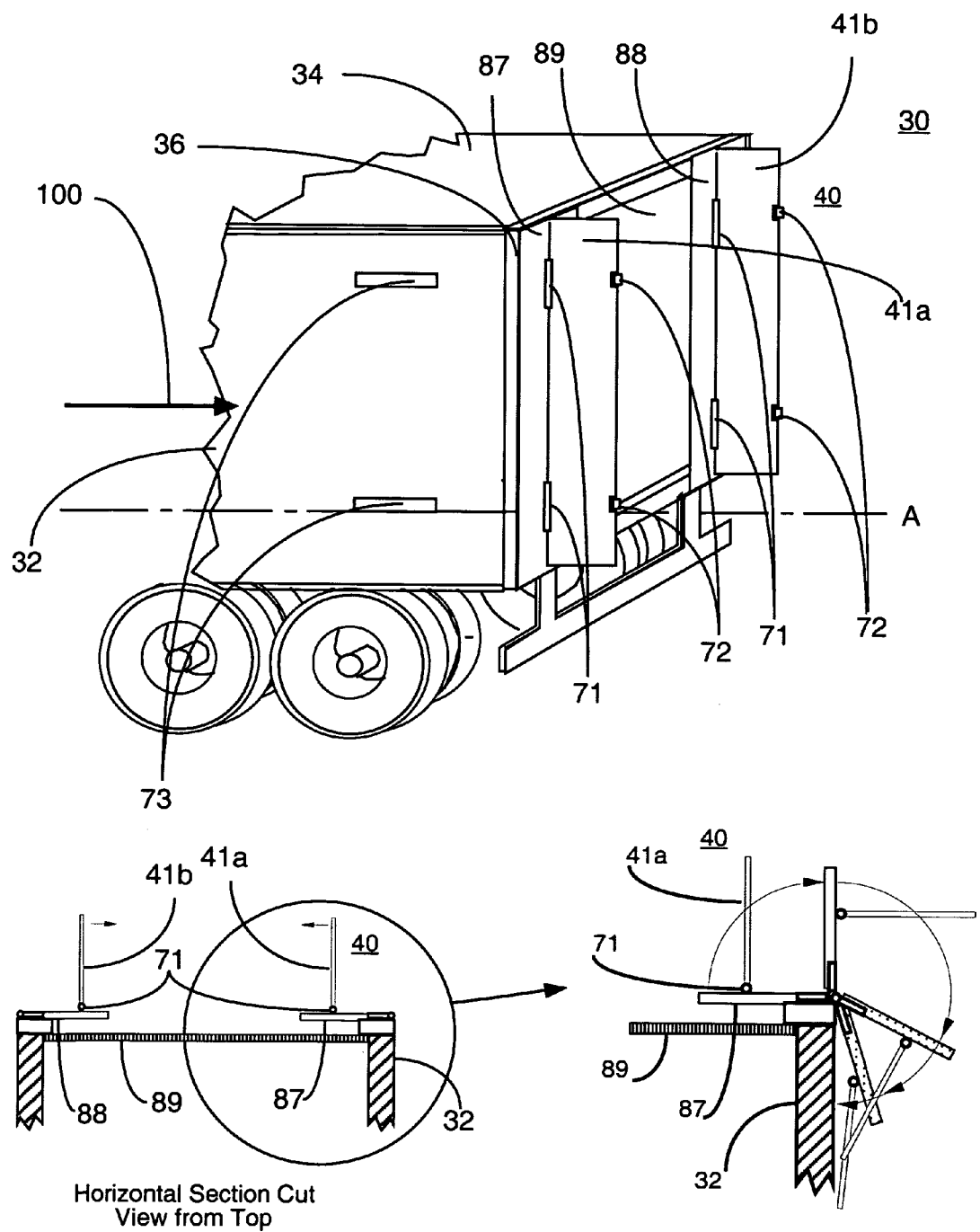
FIG. 8 is a perspective view and cross section views of the attachment and actuation concept for the invention installed on the base of a tractor trailer with a rollup door.

FIG. 8 shows an alternate embodiment of the subject invention. FIG. 8 show a rear perspective view of the aft portion of a typical rollup door 89 trailer 30 with top surface 34 and two side surfaces 32 and 33 of a tractor-trailer truck with the subject invention 40 installed on rear support panels 87 and 88 of a trailer 30. Also shown in FIG. 8 are horizontal section cuts through the trailer 30 and subject invention 40 detailing the stowage of the subject invention 40. The invention 40 is comprised of two panels 41a and 41b and spring hinge 71. The self-stowage feature of the invention 40 is accomplished when the panels 41a and 41b contacts the vehicle side surface 32, 33.

The type, size and structure of the spring hinge 71 and rear support panels 87 and 88 of the invention is determined by the geometric characteristics of the vehicle 30, the operational requirements of the vehicle 30 and the maintenance requirements of the vehicle 30.

Figure 9A:
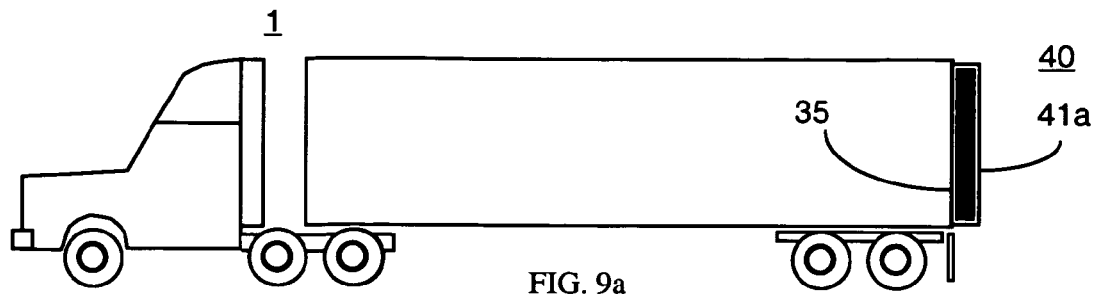
FIG. 9*a* to 9*d* are side views of alternate embodiments of the subject invention installed on a tractor-trailer truck.
Figure 9B:
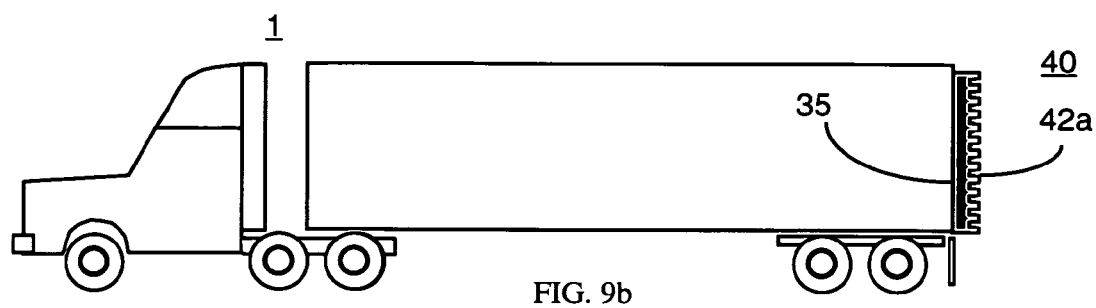
Figure 9C:
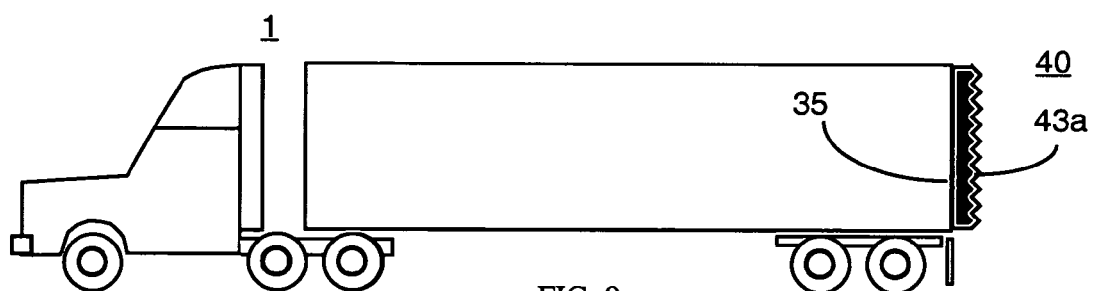
Figure 9D:
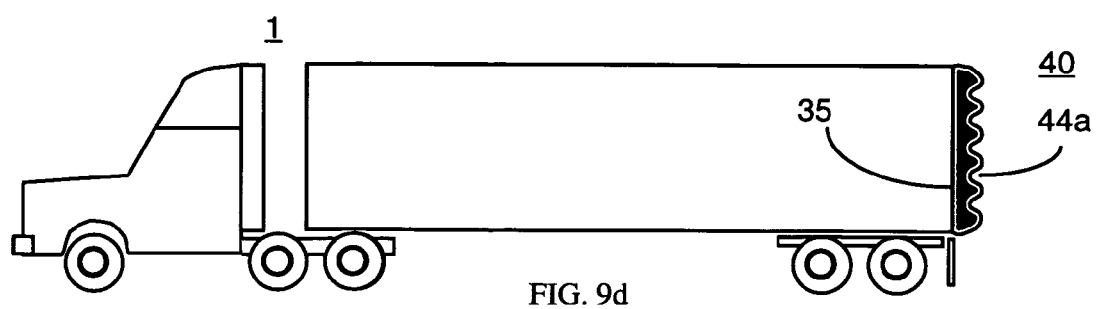

FIG. 9a to 9d are side views of various embodiments of the subject invention 40 installed on a tractor-trailer truck 1. FIG. 9a is a side view of a tractor-trailer truck 1 with the subject invention 40, comprised of a linear trailing edge panel 41 installed on the rear surface 35 of vehicle 30. FIG. 9b is a side view of a tractor-trailer truck 1 with the subject invention 40, comprised of a notched trailing edge panel 42 installed on the rear surface 35 of vehicle 30. FIG. 9c is a side view of a tractor-trailer truck 1 with the subject invention 40, comprised of a sawtooth trailing edge panel 43 installed on the rear surface 35 of vehicle 30. FIG. 9d is a side view of a tractor-trailer truck 1 with the subject invention 40, comprised of a curved trailing edge panel 44 installed on the rear surface 35 of vehicle 30.

Figure 10A:
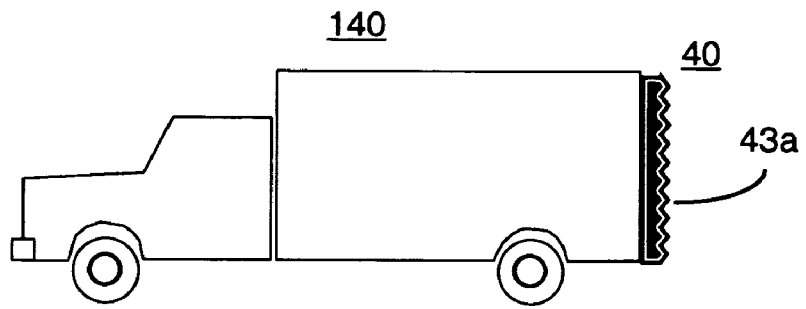
FIG. 10*a* to 10*d* are side views of alternate embodiments of the subject invention installed on various ground vehicles.
Figure 10B:
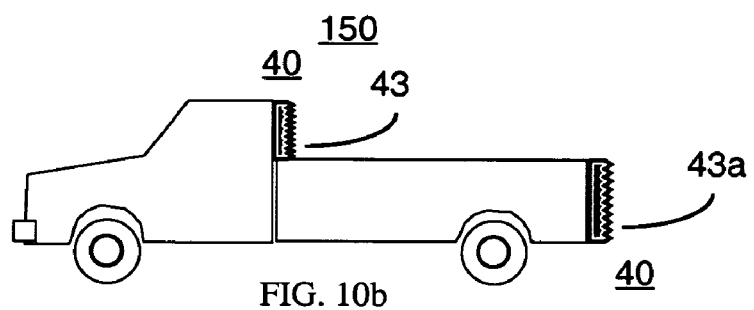
Figure 10C:
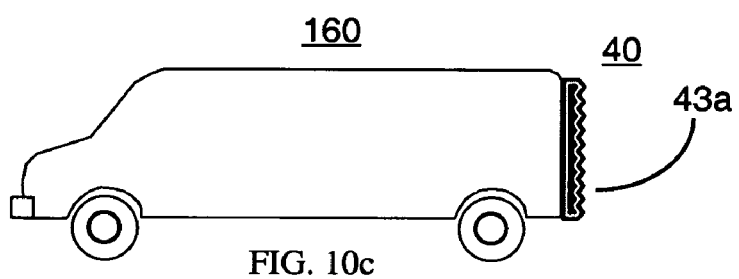
Figure 10D:
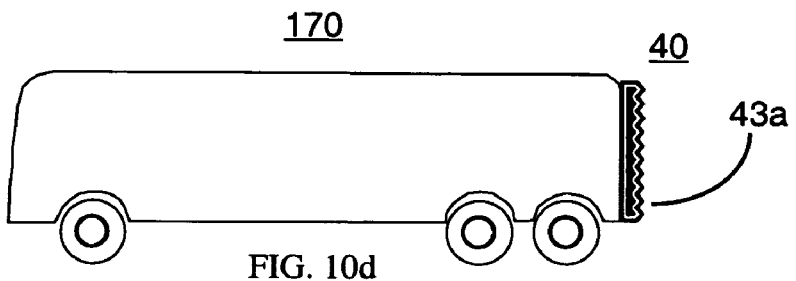

FIG. 10a to 10d are side views of various embodiments of the subject invention 40 installed on various ground vehicles. FIG. 10a is a side view of a panel truck 140 with the subject invention 40, comprised of a sawtooth trailing edge panel 43 installed on the rear surface of vehicle 140. FIG. 10b is a side view of a pick-up truck 150 with the subject invention 40, comprised of a sawtooth trailing edge panel 43 installed on the rear surface of cab and bed of the vehicle 150. FIG. 10c is a side view of a van 160 with the subject invention 40, comprised of a sawtooth trailing edge panel 43 installed on the rear surface of vehicle 160. FIG. 10d is a side view of a bus 170 with the subject invention 40, comprised of a sawtooth trailing edge panel 43 installed on the rear surface of vehicle 170.

Figure 11:
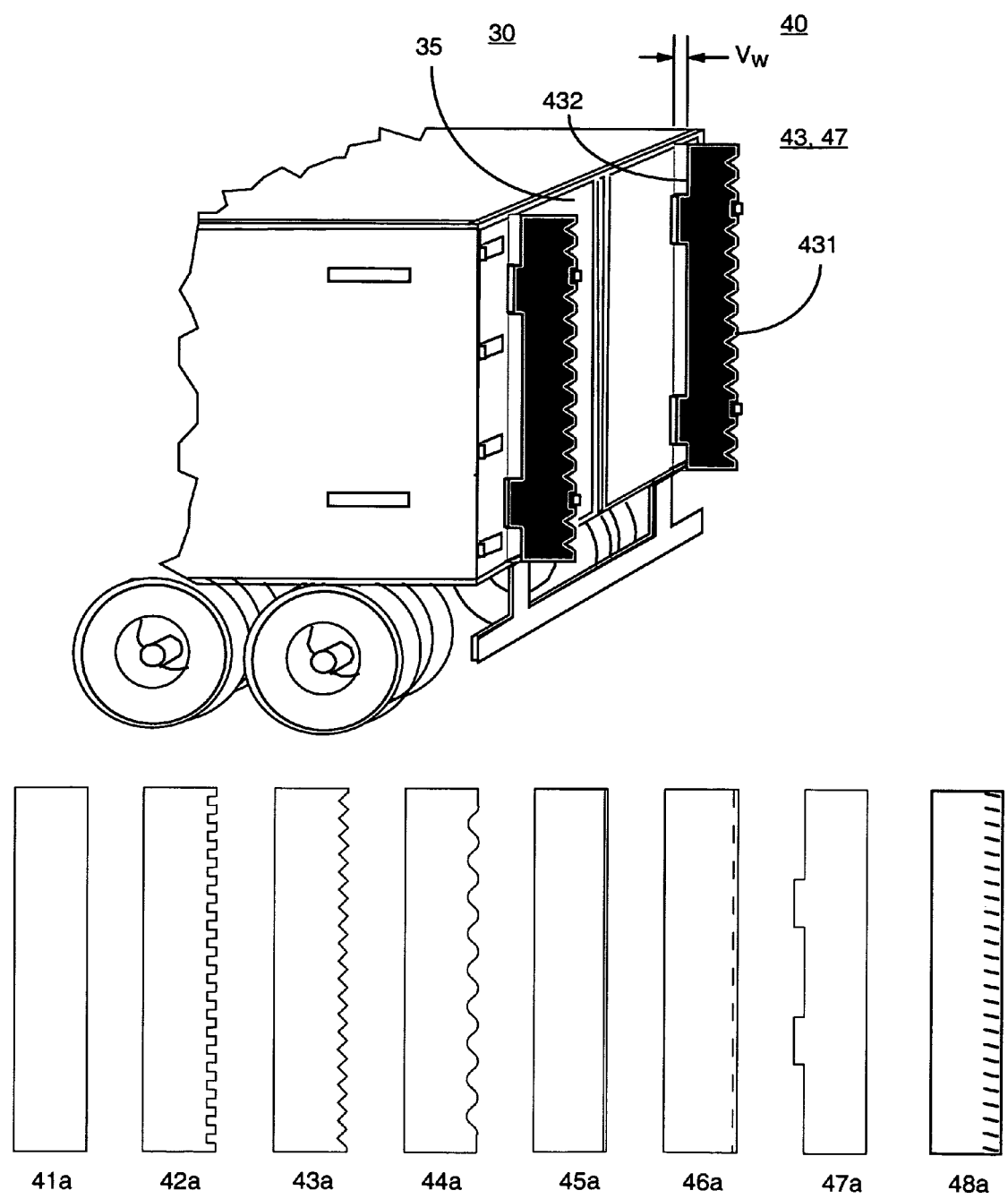
FIG. 11 is a side rear perspective view of the aft portion of a trailer showing alternate embodiments of the subject invention.

FIG. 11 show and alternate embodiment of the invention. FIG. 11 is a rear perspective view of the aft portion of a typical trailer 30 of a tractor-trailer truck showing an alternate embodiment of the subject invention 40 installed on the rear surface 35 of a trailer 30. The shape, size, and position of the subject invention 40 are a function of the geometry of the trailer 30, the operational requirements of the vehicle 30 and the maintenance requirements of the vehicle 30. The subject invention 40 is comprised of a two opposing aft extended panels 43 that are symmetrically positioned about the vehicle 30 vertical plane of symmetry. The leading edge 432 of each panel 43 may abut the rear surface 35 of vehicle 30 or may be offset from the rear surface 35 of vehicle 30 a distance Vw. A panel that is offset from the rear surface 35 a distance Vw is a vented panel 47. A vented panel 47 promotes the movement of air from the high pressure region on the rear surface 35, inboard of the subject invention 40, to a low pressure region on the rear surface 35, outboard of the subject invention 40. The trailing edge 431 of each panel 43 may be linear (panel 41a) or of a complex shape (representative panels 42a, 43a, 44a, 45a, 46a, 47a, 48a). The complex shaped trailing edges 431 are designed to energize the external side flow 100 and promote flow turning into the base wake region.

Advantages

From the description provided above, a number of advantages of the wake stabilization plates become evident:

The invention provides a novel process to reduce the drag of a bluff-base body.
(a) The invention provides a means to use vortices located on the base surface of a bluff-base body to reduce drag.
(b) The invention provides a means to reduce the aerodynamic drag and improve the operational efficiency of bluff-base vehicles.
(c) The invention provides a means to reduce the aerodynamic drag and improve the fuel efficiency of bluff-base vehicles.
(d) The invention provides a means to conserve energy and improve the operational efficiency of bluff-base vehicles.
(e) The invention provides a means to reduce the aerodynamic drag without a significant geometric modification to existing bluff-base vehicles.
(f) The invention may be easily applied to any existing bluff-base vehicle or designed into any new bluff-base vehicle.
(g) The invention allows for the efficient operation of the invention with a limited number of panels.
(h) The invention allows for the matching of complex surface shapes by the shaping and placement of the panels.
(i) Large reductions in drag force can be achieved by the trapping of two vortices.
(j) The structure, placement, and shape of each aft extended panel may be adapted to meet specific performance or vehicle integration requirements.
(k) The trailing edge shape of each aft extended panel may be linear or complex to meet specific performance or vehicle integration requirements.
(l) The ability to optimally position each aft extended panel on the vehicle rear surface.
(m) The ability to minimize weight and volume requirements within the vehicle.
(n) The ability to minimize maintenance requirements.
(o) The ability to minimize the impact on operational and use characteristics of the vehicle door system.
(p) The ability to maximize the safety of vehicle operation.

Conclusion, Ramifications, and Scope

Accordingly, the reader will see that the wake stabilization device can be used to easily and conveniently reduce aerodynamic drag on any ground vehicle for the purposes of improving the operational performance of the vehicle. Furthermore, the two panels comprising the wake stabilization device has the additional advantages in that:

it provides a aerodynamic drag reduction force over the base of the vehicle;
it allows the contour of the host surface to be easily matched;
it allows easy application to any existing vehicle or designed into any existing vehicle;
it allows the device to be fabricated as an independent unit that may be applied to an existing surface;
it allows for optimal positioning of each aft extended panel on the vehicle base surface;
it allows the design of a system with minimum weight and to require minimum volume within the vehicle;
it allows minimum maintenance requirements;
it allows minimum impact on door operation and use.
it allows for the maximum safety of vehicle operation;

Although the description above contains many specificities, these should not be construed as limiting the scope of the invention but as merely providing illustrations of some of the presently preferred embodiments of this invention. For example, the rearward extending panels can be composed of various planar shapes such as ellipsoid, quadratic, etc.; the thickness and width can vary along the length; the material can be any light-weight and structurally sound material such as wood, plastic, metal, composites, etc.; the substrate can be any metal, wood, plastic, composite, rubber, ceramic, etc.; the application surface can be that of a metal, wood, plastic, composite, rubber, ceramic, etc. The attachment and actuation hardware can be either conventional off the shelf or designed specifically for the subject invention.

The invention has been described relative to specific embodiments thereof and relative to specific vehicles, it is not so limited. The invention is considered applicable to any road vehicle including automobiles, trucks, buses, trains, recreational vehicles and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

I claim:

1. An apparatus for reducing the aerodynamic drag of a body having a bluff base, a top, a bottom, and two sides, the bluff base having a left half and a right half on either side of the centerline, the apparatus comprising:

a first substantially rectangular panel;
a second substantially rectangular panel;
each of the panels having a width, length, and thickness;
wherein the panels are symmetrically positioned about the centerline of the bluff base in opposition, wherein the first panel is attached lengthwise to the right-half of the bluff base and the second panel is attached lengthwise to the left-half of the bluff base so that the surface of the panels are parallel to the sides of the body and each panel's width extends rearward from the body bluff base creating a lengthwise trailing edge, wherein each panel is inset at substantially similar distances from the respective sides of the body and no more than about 10 percent of the body width;
wherein the width of the panels is between about 15 and 25 percent of the body width, the thickness of the panels is no more than about three inches. and the length of the panels is substantially equivalent to the vertical height of the body bluff base;
wherein each of the first and second panels defines an outer surface facing in the same direction as the corresponding side of the body and an inward surface facing the opposing panel, and each of the first and second panels are configured, when exposed to a flow of air along the body, to trap a vortex at its outer surface adjacent to the bluff base and modify the strength of the vortex;
wherein each of the first and second panels are configured, when exposed to a flow of air along the body, to trap a vertically oriented vortex at its outer surface adjacent to the bluff base, enabling the flow across the body to expand as it exits the bluff base and further enabling a substantially steady and symmetric air flow as it exits the bluff base and the trailing edges of the panels;
wherein the body is a vehicle having swinging rear doors on the left-half and the right-half of the bluff base, and further comprising a control means connected between the bluff base and each panel for maintaining each panel in an operating position and for stowing each panel when not in use;
wherein said control means for maintaining each said panel in an operating position and for stowing each panel when not in use comprises
  a first spring hinge system connecting first said panel leading edge to right side swinging rear door of said vehicle,
  a second spring hinge system connecting second said panel leading edge to left side swinging rear door of said vehicle,
  a control means to maintain each said panel in operating position includes spring hinge torsion force and mechanical stop means for preventing movement of said panels from rotating from said operating position towards outer most edges of said rear swinging doors,
  a control means includes means to allow said panels to rotate from said operating position towards inner most edges of said rear swinging door when said rear swinging doors are opened and said panels contact side surfaces of said vehicle, and
  a low friction system incorporated into each said panel trailing edge and onto each said vehicle side surface at a location coincident with the area of contact between said panels trailing edge and said vehicle side surfaces when said vehicle rear swing doors are opened.

2. An apparatus for reducing the aerodynamic drag of a body having a bluff base, a top, a bottom, and two sides, the bluff base having a left half and a right half on either side of the centerline, the apparatus comprising:

a first substantially rectangular panel;
a second substantially rectangular panel;
each of the panels having a width, length, and thickness;
wherein the panels are symmetrically positioned about the centerline of the bluff base in opposition, wherein the first panel is attached lengthwise to the right-half of the bluff base and the second panel is attached lengthwise to the left-half of the bluff base so that the surface of the panels are parallel to the sides of the body and each panel's width extends rearward from the body bluff base creating a lengthwise trailing edge, wherein each panel is inset at substantially similar distances from the respective sides of the body and no more than about 10 percent of the body width;
wherein the width of the panels is between about 15 and 25 percent of the body width, the thickness of the panels is no more than about three inches. and the length of the panels is substantially equivalent to the vertical height of the body bluff base;
wherein each of the first and second panels defines an outer surface facing in the same direction as the corresponding side of the body and an inward surface facing the opposing panel, and each of the first and second panels are configured, when exposed to a flow of air along the body, to trap a vortex at its outer surface adjacent to the bluff base and modify the strength of the vortex;
wherein each of the first and second panels are configured, when exposed to a flow of air along the body, to trap a vertically oriented vortex at its outer surface adjacent to the bluff base, enabling the flow across the body to expand as it exits the bluff base and further enabling a substantially steady and symmetric air flow as it exits the bluff base and the trailing edges of the panels;
wherein the body is a vehicle having swinging rear doors on the left-half and the right-half of the bluff base, and further comprising a control means connected between the bluff base and each panel for maintaining each panel in an operating position and for stowing each panel when not in use;
wherein said control means comprises a first hinge system connecting first said panel leading edge to right side swinging rear door of said vehicle, a second hinge system connecting second said panel leading edge to left side swinging rear door of said vehicle;
a first pneumatic spring system connecting first said panel inward facing surface to right side swinging rear door of said vehicle,
a second pneumatic spring system connecting second said panel inward facing surface to left side swinging rear door of said vehicle,
said first pneumatic spring system is rotationally attached to inward facing surface of said right side panel and said second pneumatic spring system is rotationally attached to inward facing surface of said left side panel,
said first pneumatic spring system is rotationally attached to right side rear swinging door of said vehicle and said second pneumatic spring system is rotationally attached to left side rear swinging door of said vehicle, a control means to maintain each said panel in the operating position includes compression from said pneumatic springs and mechanical stop means for preventing movement of said panels from rotating from said operating position towards outer most edges of said rear swinging doors, a control means includes means to allow said panels to rotate from said operating position towards the inner most edges of said rear swinging doors when said rear swinging doors are opened and said panels contact side surfaces of said vehicle, and a low friction system incorporated into each said panel trailing edge and onto each said vehicle side surface at a location coincident with the area of contact between said panels trailing edge and said vehicle side surfaces when said vehicle rear swing doors are opened.

3. An aerodynamic drag reduction device for use on a bluff base vehicle having a roll-up rear door encompassing the majority of the bluff base surface of the vehicle, the device comprising:

a pair of rear support plates rotationally attached to the side edges of the vehicle bluff base;

a pair of rearward extending panels, each attached to one of the rear support plates;

wherein the panels are positioned substantially symmetrically about the bluff base centerline and are substantially parallel to each other and to the side edges of the bluff base;

wherein the panels have a thickness of up to 3 inches and extend rearward a distance equal to each other and 15 to 25 percent of the body width;

wherein the panels have a length that is substantially similar to the vertical height of the bluff base;

wherein the panels are inset from the side edges of the vehicle bluff base at a distance of about 0 to 10 percent of the body width;

whereby the panels trap vortices on their outside surfaces in order to reduce drag.

4. The drag reduction device of claim 3, wherein the trailing edge of each panel is comprised of notches having a substantially rectangular shape, with each notch having a depth, length, space to the next adjacent notch, and inset from the panel edge, such that the dimensions of each are no more than 10% of the length of the panel.

5. The drag reduction device of claim 3, wherein the trailing edge of each panel is comprised of sawteeth having a substantially triangular shape, with each sawtooth having a depth, length, and inset from the panel edge, such that the dimensions of each are no more than 10% of the length of the panel.

6. The drag reduction device of claim 3, wherein the trailing edge of each panel is comprised of curves, with each curve having a depth, length, and inset from the panel edge, such that the dimensions of each are no more than 10% of the length of the panel.

7. The drag reduction device of claim 3, further comprising a stall strip attached to the trailing edge of each panel, wherein the thickness of the stall strip is no more than the panel thickness and the width of the stall strip is no more than 10% of the width of the panel.

8. The drag reduction device of claim 3, further comprising a gurney flap attached to the trailing edge of each panel, wherein the thickness of the gurney flap is no more than the panel thickness and the width of the gurney flap is no more than 10% of the width of the panel.

9. The drag reduction device of claim 3, wherein the leading edge of each panel is comprised of vent slots having a substantially rectangular shape, with each notch having width which is no more than 10% of the width of the panel.

10. The drag reduction device of claim 3, further comprising a plurality of micro vortex strakes attached to the side of each panel facing away from the vehicle center line and along the trailing edge of each panel, wherein the micro vortex strakes have a width $W_{VG}$ of no more than 1% of the width of the panel, a length $L_{VG}$ of no more than 5% of the width of the panel, space to the next adjacent strake $S_{VG}$ of no more than 5% of the width of the panel, and are angled downward from the leading edge of the panel to the trailing edge at an angle $\alpha_{VG}$ of no more than 10% from horizontal.

11. The drag reduction device of claim 3, wherein the support plates swing outward from the vehicle bluff base, and wherein the device further comprises hinges connecting each panel to the support plates.

* * * * *